US011625016B2

(12) United States Patent
Cao et al.

(10) Patent No.: US 11,625,016 B2
(45) Date of Patent: Apr. 11, 2023

(54) SYSTEMS AND METHODS FOR HVAC EQUIPMENT PREDICTIVE MAINTENANCE USING MACHINE LEARNING

(71) Applicant: Siemens Industry, Inc., Alpharetta, GA (US)

(72) Inventors: Mingzhi Cao, Philadelphia, PA (US); Zhen Song, Austin, TX (US); Megan McHugh, Pflugerville, TX (US); Yubo Wang, Princeton, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 286 days.

(21) Appl. No.: 16/999,275

(22) Filed: Aug. 21, 2020

(65) Prior Publication Data
US 2022/0057766 A1 Feb. 24, 2022

(51) Int. Cl.
*G05B 19/042* (2006.01)
*G05B 23/02* (2006.01)
*G06N 5/04* (2023.01)

(52) U.S. Cl.
CPC ....... *G05B 19/042* (2013.01); *G05B 23/0283* (2013.01); *G06N 5/04* (2013.01); *G05B 2219/25011* (2013.01); *G05B 2219/2614* (2013.01)

(58) Field of Classification Search
CPC .............. G05B 19/042; G05B 23/0283; G05B 2219/25011; G05B 2219/2614; G05B 23/024; G06N 5/04; G06Q 10/20
See application file for complete search history.

(56) References Cited

U.S. PATENT DOCUMENTS

| 6,681,215 B2 | 1/2004 | Jammu |
| 9,366,451 B2 | 6/2016 | Guo et al. |
| 9,753,455 B2 | 9/2017 | Drees |
| 10,147,040 B2 | 12/2018 | Khurshudov et al. |

(Continued)

FOREIGN PATENT DOCUMENTS

| CN | 107806690 A | 3/2018 |
| CN | 110516848 A | 11/2019 |

OTHER PUBLICATIONS

PCT Search Report dated Oct. 18, 2021, for PCT Application PCT/US2021/042514, 14 pages.

(Continued)

*Primary Examiner* — Kidest Bahta

(57) ABSTRACT

Methods for predictive maintenance with using machine learning in a building automation system and corresponding systems and computer-readable mediums. A method includes receiving device event data corresponding to a device and executing an inference engine to determine root cause fault data corresponding to the device event data. The method includes executing a predictive maintenance engine to produce a survival analysis for the physical device based on the root cause fault data. The method includes producing updated failure data by the predictive maintenance engine, based on the survival analysis, and providing the updated failure data to the inference engine. The inference engine thereafter uses the updated failure data in a subsequent root cause analysis. The method includes outputting the survival analysis.

18 Claims, 17 Drawing Sheets

(56) References Cited

U.S. PATENT DOCUMENTS

| | | | |
|---|---|---|---|
| 2009/0150325 A1* | 6/2009 | De | G06N 7/005 |
| | | | 715/764 |
| 2011/0047418 A1* | 2/2011 | Drees | G05B 15/02 |
| | | | 714/57 |
| 2013/0197698 A1* | 8/2013 | Shah | F24F 11/30 |
| | | | 700/276 |
| 2014/0142727 A1* | 5/2014 | Giering | G05B 9/05 |
| | | | 700/79 |
| 2016/0370799 A1* | 12/2016 | Denton | G06N 20/00 |
| 2017/0169380 A1 | 6/2017 | Maroli et al. | |
| 2018/0211176 A1 | 7/2018 | Khurshudov et al. | |
| 2018/0212832 A1 | 7/2018 | Baird et al. | |
| 2018/0335772 A1 | 11/2018 | Gorinevsky | |
| 2018/0347843 A1 | 12/2018 | Friedenberger et al. | |
| 2018/0373234 A1 | 12/2018 | Khalate et al. | |
| 2020/0265331 A1 | 8/2020 | Tashman et al. | |

OTHER PUBLICATIONS

Steven T. Taylor, "Resetting Setpoints Using Trim & Respond Logic," ASHRAE Journal, Nov. 2015, 6 pages.

Fu Xiao, et al., "Bayesian network based FDD strategy for variable air volume terminals", Automation in Construction, Elsevier B.V., 2013, 13 pages.

Yang Zhao, et al., "Diagnostic Bayesian networks for diagnosing air handling units faults—Part II: Faults in coils and sensors". Applied Thermal Engineering, Elsevier Ltd., 2015, 13 pages.

Steven T. Taylor, "Increasing Efficiency With VAV System Static Pressure Static Pressure Setpoint Reset," ASHRAE Journal, Jun. 2007, 9 pages.

\* cited by examiner

| TIME | DEVICE | SITE | EVENT | PROBABILITY | MANUAL |
|---|---|---|---|---|---|
| 10/1/2019 9:01 | VALVE 1 | BUILDING 1 | FAULT | 92 | NO |
| 10/1/2019 10:30 | VALVE 1 | BUILDING 1 | FAULT VERIFIED AND VALVE REPLACED | 100 | YES |
| 10/2/2019 11:20 | VALVE 2 | BUILDING 2 | FAULT | 72 | NO |

SYSTEMS AND METHODS FOR HVAC EQUIPMENT PREDICTIVE MAINTENANCE USING MACHINE LEARNING

CROSS-REFERENCE TO OTHER APPLICATIONS

The present disclosure includes some subject matter in common with, but is otherwise unrelated to, concurrently filed U.S. patent application Ser. No. 16/999,196, filed on Aug. 21, 2020, entitled "Systems and Methods to Assess and Repair Data Using Data Quality Indicators" and Ser. No. 16/999,225, filed on Aug. 21, 2020, entitled "Systems and Methods for Fault Diagnostics in Building Automation Systems", which are hereby incorporated by reference.

TECHNICAL FIELD

The present disclosure is directed, in general, to systems and methods for predictive maintenance in building-control systems and other systems.

BACKGROUND OF THE DISCLOSURE

Building automation systems encompass a wide variety of systems that aid in the monitoring and control of various aspects of building operation. Building automation systems include security systems, fire safety systems, lighting systems, and heating, ventilation, and air conditioning (HVAC) systems. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. One example of a building automation system is the DXR Controller, available from Siemens Industry, Inc. Building Technologies Division of Buffalo Grove, Ill. ("Siemens"). In this system, several control stations connected via an Ethernet or another type of network may be distributed throughout one or more building locations, each having the ability to monitor and control system operation.

Maintenance of building automation systems can be expensive and time-consuming. Device failures can impact production, comfort levels, and facility operations, and can do so without warning. Improved systems are desirable.

SUMMARY OF THE DISCLOSURE

This disclosure describes systems and methods for predictive maintenance with using machine learning in a building automation system and corresponding systems and computer-readable mediums. A method performed by a data processing system of the building automation system includes receiving device event data corresponding to a physical device of the building automation system. The method includes executing an inference engine to determine root cause fault data corresponding to the device event data. The method includes executing a predictive maintenance engine to produce a survival analysis for the device based on the root cause fault data. The method includes producing updated failure data by the predictive maintenance engine, based on the survival analysis, and providing the updated failure data to the inference engine, wherein the inference engine thereafter uses the updated failure data in a subsequent root cause analysis. The method includes outputting the survival analysis, such as displaying or transmitting the survival analysis.

In some embodiments, the device event data includes sensor data for the device for a specific time instance and a failure rate for the device for the same time instance. Some embodiments further include generating survival curves for an aggregation of multiple devices using AND SA or OR SA operators that specify survival relationships between the multiple devices. In some embodiments, device event data is received, directly or indirectly, from one or more event detection applications that identify device or system events based on sensor data. In some embodiments, the root cause fault data includes a probability of failure for the device for a specific time instance. In some embodiments, executing the predictive maintenance engine to produce a survival analysis includes receiving the root cause fault data, producing an augmented time-event table based on the root cause fault data, and generating a similarity-based survival curve using the augmented time-event table and similarity between the device event data corresponding to the device and device event data of other devices. In some embodiments, the inference engine includes and bases decisions on a Bayesian network that associates device events with device faults. In some embodiments, the inference engine combines device event data with outputs of a Bayesian network to produce the root cause fault data. In some embodiments, the survival analysis includes one or more survival curves produced by performing a probabilistic parametric survival analysis process, performing a probabilistic non-parametric survival analysis process, or performing a probabilistic similarity-based survival analysis process. Some embodiments also include executing the predictive maintenance engine to produce a cost analysis corresponding to the device, based on the survival analysis. Some embodiments also include executing the predictive maintenance engine to produce a cost analysis corresponding to the device, based on the survival analysis, and generating a cost analysis for an aggregation of multiple devices using AND CA or OR CA operators that based on survival relationships between the multiple devices. In some embodiments, the survival analysis includes performing a probabilistic similarity-based survival analysis (SSA) process and includes performing principal component analysis and regression analysis on selected device event data to build a health index representing a survival probability for the device.

The foregoing has outlined rather broadly some features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

A building automation system (BAS) such as disclosed herein can operate in an automatic operation mode that helps operate systems in the space efficiently to save energy. The BAS continuously evaluates environmental conditions and energy usage in the space and can determine and indicate to users when the space is being operated most efficiently. Similarly, the BAS can determine and indicate when the systems operate inefficiently, such as due to an occupant overriding the room control because of personal preference or due to weather conditions change drastically. The BAS can automatically, or at the input of a user, adjust the control settings to make the systems operate efficiently again.

For proper operation of the BAS, the physical devices and other equipment in the BAS must be maintained and occasionally replaced. Delaying maintenance or replacement until failure actually occurs causes unneeded expense and results in inconvenience and discomfort to the occupants.

Disclosed embodiments include systems and methods for predictive maintenance of HVAC equipment and other physical equipment with using machine learning to ensure proper operation of the BAS or other system.

Figure 1:
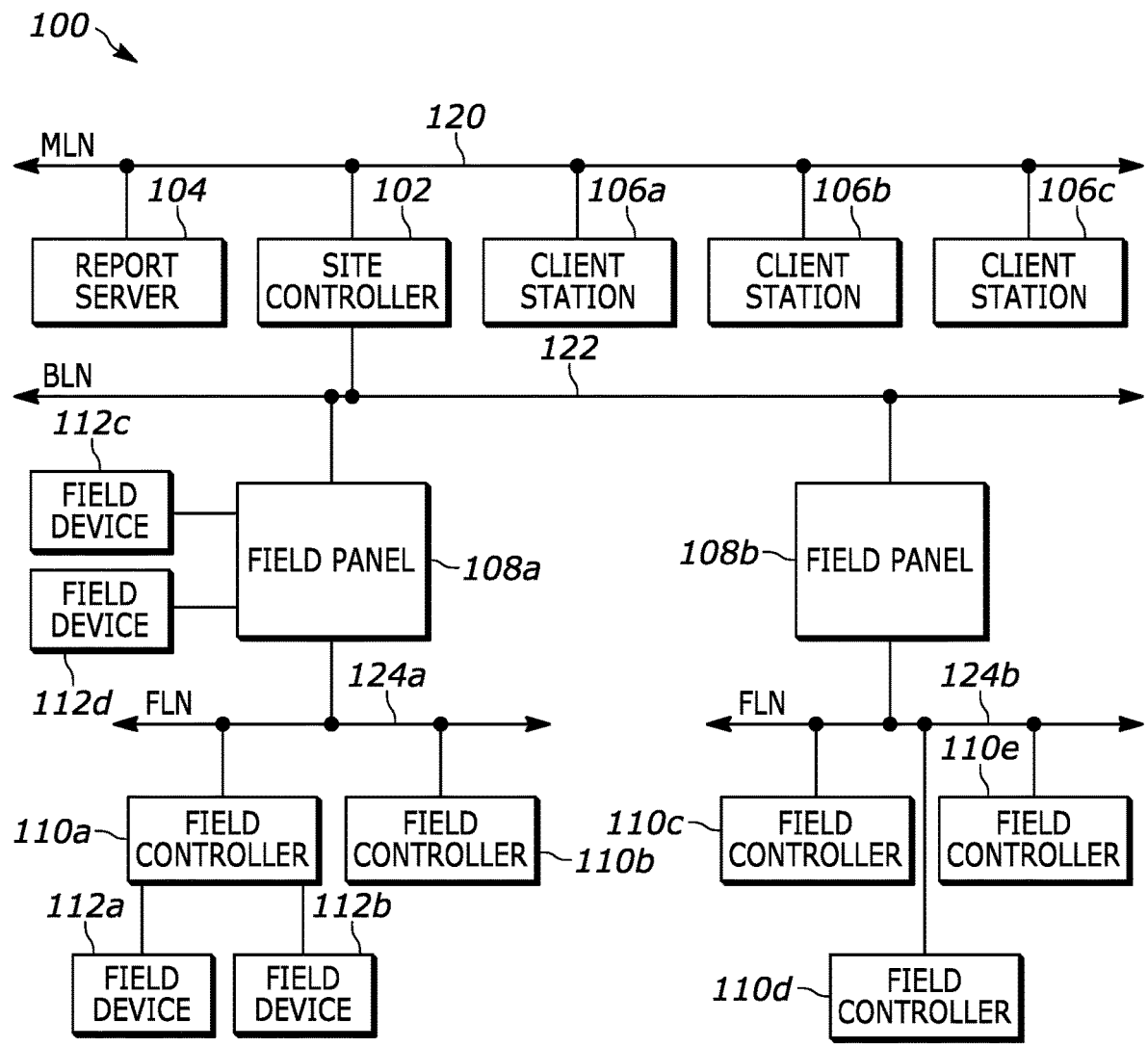
FIG. 1 illustrates a block diagram of a building automation system in which the data quality of a heating, ventilation, and air conditioning (HVAC) system or other systems may be improved in accordance with the present disclosure.

FIG. 1 illustrates a block diagram of a building automation system 100 in which disclosed embodiments can be implemented. The building automation system 100 is an environmental control system configured to control at least one of a plurality of environmental parameters within a building, such as temperature, humidity, lighting and/or the like. For example, for a particular embodiment, the building automation system 100 may comprise the DXR Controller building automation system that allows the setting and/or changing of various controls of the system. While a brief description of the building automation system 100 is provided below, it will be understood that the building automation system 100 described herein is only one example of a particular form or configuration for a building automation system and that the system 100 may be implemented in any other suitable manner without departing from the scope of this disclosure.

For the illustrated embodiment, the building automation system 100 comprises a site controller 102, a report server 104, a plurality of client stations 106a-c, a plurality of field panels 108a-b, a plurality of field controllers 110a-e and a plurality of field devices 112a-d. Although illustrated with three client stations 106, two field panels 108, five field controllers 110 and four field devices 112, it will be understood that the system 100 may comprise any suitable number of any of these components 106, 108, 110 and 112 based on the particular configuration for a particular building.

The site controller 102, which may comprise a computer or a general-purpose processor, is configured to provide overall control and monitoring of the building automation system 100. The site controller 102 may operate as a data server that is capable of exchanging data with various elements of the system 100. As such, the site controller 102 may allow access to system data by various applications that may be executed on the site controller 102 or other supervisory computers (not shown in FIG. 1).

For example, the site controller 102 may be capable of communicating with other supervisory computers, Internet gateways, or other gateways to other external devices, as well as to additional network managers (which in turn may connect to more subsystems via additional low-level data networks) by way of a management level network (MLN) 120. The site controller 102 may use the MLN 120 to exchange system data with other elements on the MLN 120, such as the report server 104 and one or more client stations 106. The report server 104 may be configured to generate reports regarding various aspects of the system 100. Each client station 106 may be configured to communicate with the system 100 to receive information from and/or provide modifications to the system 100 in any suitable manner. The MLN 120 may comprise an Ethernet or similar wired network and may employ TCP/IP, BACnet, and/or other protocols that support high-speed data communications.

The site controller 102 may also be configured to accept modifications and/or other input from a user. This may be accomplished via a user interface of the site controller 102 or any other user interface that may be configured to communicate with the site controller 102 through any suitable network or connection. The user interface may include a keyboard, touchscreen, mouse, or other interface components. The site controller 102 is configured to, among other things, affect or change operational data of the field panels 108, as well as other components of the system 100. The site controller 102 may use a building level network (BLN) 122 to exchange system data with other elements on the BLN 122, such as the field panels 108.

Each field panel 108 may comprise a general-purpose processor and is configured to use the data and/or instructions from the site controller 102 to provide control of its one or more corresponding field controllers 110. While the site controller 102 is generally used to make modifications to one or more of the various components of the building automation system 100, a field panel 108 may also be able to provide certain modifications to one or more parameters of the system 100. Each field panel 108 may use a field level network (FLN) 124 to exchange system data with other elements on the FLN 124, such as a subset of the field controllers 110 coupled to the field panel 108.

Each field controller 110 may comprise a general-purpose processor and may correspond to one of a plurality of localized, standard building automation subsystems, such as building space temperature control subsystems, lighting control subsystems, or the like. For a particular embodiment, the field controllers 110 may comprise the model DXR controller available from Siemens. However, it will be understood that the field controllers 110 may comprise any other suitable type of controllers without departing from the scope of the present invention.

To carry out control of its corresponding subsystem, each field controller 110 may be coupled to one or more field devices 112. Each field controller 110 is configured to use the data and/or instructions from its corresponding field panel 108 to provide control of its one or more corresponding field devices 112. For some embodiments, some of the field controllers 110 may control their subsystems based on sensed conditions and desired set point conditions. For these embodiments, these field controllers 110 may be configured to control the operation of one or more field devices 112 to attempt to bring the sensed condition to the desired set point condition. It is noted that in the system 100, information from the field devices 112 may be shared between the field controllers 110, the field panels 108, the site controller 102 and/or any other elements on or connected to the system 100.

In order to facilitate the sharing of information between subsystems, groups of subsystems may be organized into an FLN 124. For example, the subsystems corresponding to the field controllers 110a and 110b may be coupled to the field panel 108a to form the FLN 124a. The FLNs 124 may each comprise a low-level data network that may employ any suitable proprietary or open protocol.

Each field device 112 may be configured to measure, monitor and/or control various parameters of the building automation system 100. Examples of field devices 112 include lights, thermostats, temperature sensors, lighting sensors, fans, damper actuators, heaters, chillers, alarms, HVAC devices, window blind controls and sensors, and numerous other types of field devices. The field devices 112 may be capable of receiving control signals from and/or sending signals to the field controllers 110, the field panels 108 and/or the site controller 102 of the building automation system 100. Accordingly, the building automation system 100 is able to control various aspects of building operation by controlling and monitoring the field devices 112. In particular, each or any of the field devices 112 can generate the data that is processed as described herein. A physical device of the building automation system 100 can include any of these exemplary field devices 112.

As illustrated in FIG. 1, any of the field panels 108, such as the field panel 108a, may be directly coupled to one or more field devices 112, such as the field devices 112c and 112d. For this type of embodiment, the field panel 108a may be configured to provide direct control of the field devices 112c and 112d instead of control via one of the field controllers 110a or 110b. Therefore, for this embodiment, the functions of a field controller 110 for one or more particular subsystems may be provided by a field panel 108 without the need for a field controller 110.

Figure 2:
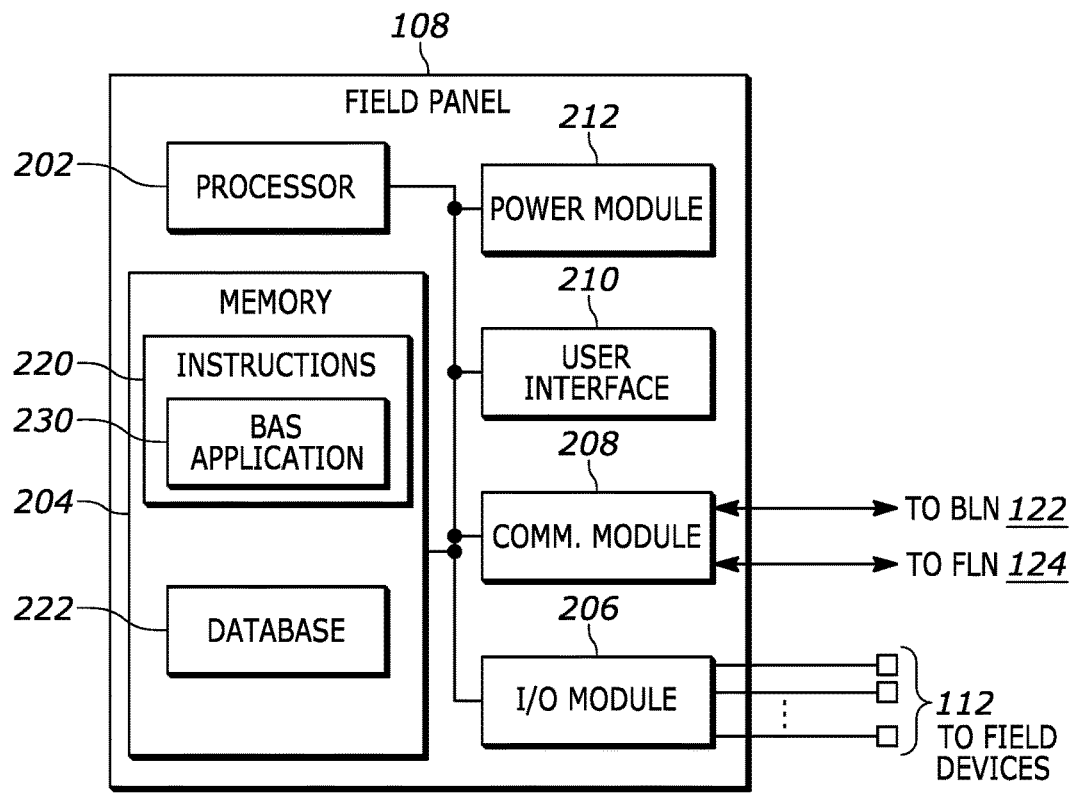
FIG. 2 illustrates details of one of the field panels of FIG. 1 in accordance with the present disclosure.

FIG. 2 illustrates details of one of the field panels 108 in accordance with the present disclosure. For this particular embodiment, the field panel 108 comprises a processor 202, a memory 204, an input/output (I/O) module 206, a communication module 208, a user interface 210 and a power module 212. The memory 204 comprises any suitable data store capable of storing data, such as instructions 220 and a database 222. It will be understood that the field panel 108 may be implemented in any other suitable manner without departing from the scope of this disclosure.

The processor 202 is configured to operate the field panel 108. Thus, the processor 202 may be coupled to the other components 204, 206, 208, 210 and 212 of the field panel 108. The processor 202 may be configured to execute program instructions or programming software or firmware stored in the instructions 220 of the memory 204, such as BAS application software 230. In addition to storing the instructions 220, the memory 204 may also store other data for use by the system 100 in the database 222, such as various records and configuration files, graphical views and/or other information.

Execution of the BAS application 230 by the processor 202 may result in control signals being sent to any field devices 112 that may be coupled to the field panel 108 via the I/O module 206 of the field panel 108. Execution of the BAS application 230 may also result in the processor 202 receiving status signals and/or other data signals from field devices 112 coupled to the field panel 108 and storage of associated data in the memory 204, and that data can be processed as described herein. In one embodiment, the BAS application 230 may be provided by or implemented in the DXR Controller commercially available from Siemens Industry, Inc. However, it will be understood that the BAS application 230 may comprise any other suitable BAS control software.

The I/O module 206 may comprise one or more input/output circuits that are configured to communicate directly with field devices 112. Thus, for some embodiments, the I/O module 206 comprises analog input circuitry for receiving analog signals and analog output circuitry for providing analog signals.

The communication module 208 is configured to provide communication with the site controller 102, other field panels 108 and other components on the BLN 122. The communication module 208 is also configured to provide communication to the field controllers 110, as well as other components on the FLN 124 that is associated with the field panel 108. Thus, the communication module 208 may comprise a first port that may be coupled to the BLN 122 and a second port that may be coupled to the FLN 124. Each of the ports may include an RS-485 standard port circuit or other suitable port circuitry.

The field panel 108 may be capable of being accessed locally via the interactive user interface 210. A user may control the collection of data from field devices 112 through the user interface 210. The user interface 210 of the field panel 108 may include devices that display data and receive input data. These devices may be permanently affixed to the field panel 108 or portable and moveable. For some embodiments, the user interface 210 may comprise an LCD-type screen or the like and a keypad. The user interface 210 may be configured to both alter and show information regarding the field panel 108, such as status information and/or other data pertaining to the operation of, function of and/or modifications to the field panel 108.

The power module 212 may be configured to supply power to the components of the field panel 108. The power module 212 may operate on standard 120 volt AC electricity, other AC voltages or DC power supplied by a battery or batteries.

Figure 3:
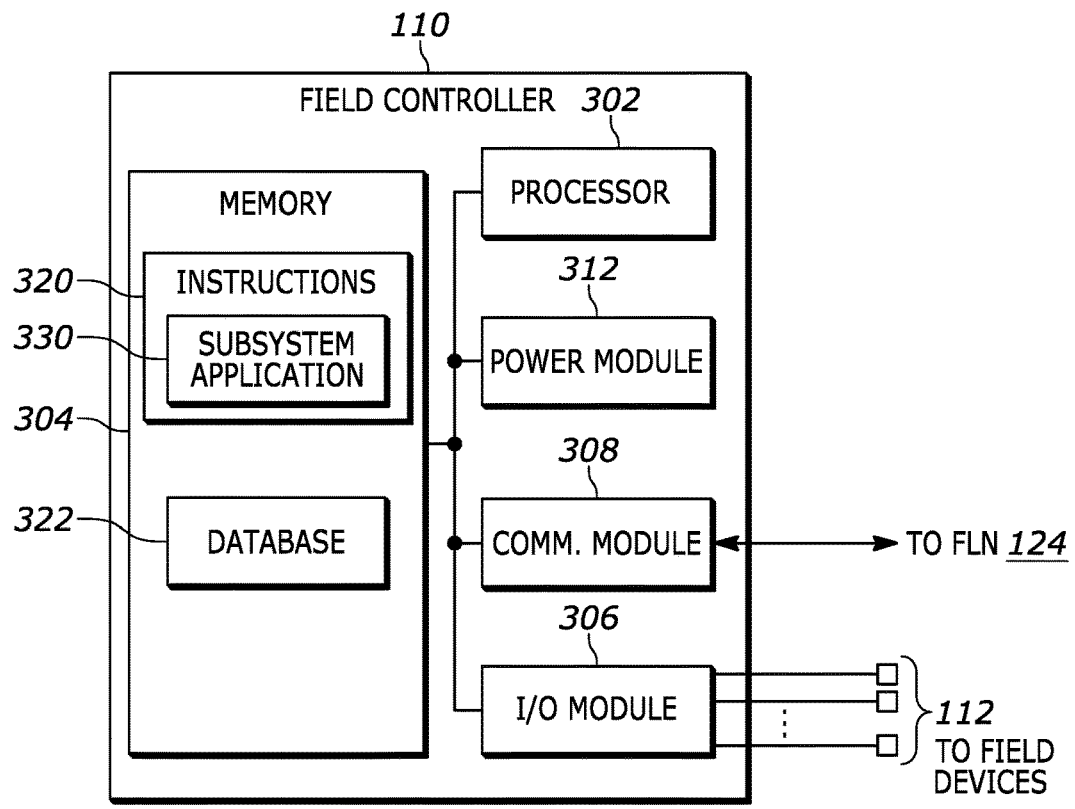
FIG. 3 illustrates details of one of the field controllers of FIG. 1 in accordance with the present disclosure.

FIG. 3 illustrates details of one of the field controllers 110 in accordance with the present disclosure. For this particular embodiment, the field controller 110 comprises a processor 302, a memory 304, an input/output (I/O) module 306, a communication module 308 and a power module 312. For some embodiments, the field controller 110 may also comprise a user interface (not shown in FIG. 3) that is configured to alter and/or show information regarding the field controller 110. The memory 304 comprises any suitable data store capable of storing data, such as instructions 320 and a database 322. It will be understood that the field controller 110 may be implemented in any other suitable manner without departing from the scope of this disclosure. For some embodiments, the field controller 110 may be positioned in, or in close proximity to, a room of the building where temperature or another environmental parameter associated with the subsystem may be controlled with the field controller 110.

The processor 302 is configured to operate the field controller 110. Thus, the processor 302 may be coupled to the other components 304, 306, 308 and 312 of the field controller 110. The processor 302 may be configured to execute program instructions or programming software or firmware stored in the instructions 320 of the memory 304, such as subsystem application software 330. For a particular example, the subsystem application 330 may comprise a temperature control application that is configured to control and process data from all components of a temperature control subsystem, such as a temperature sensor, a damper actuator, fans, and various other field devices. In addition to storing the instructions 320, the memory 304 may also store other data for use by the subsystem in the database 322, such as various configuration files and/or other information.

Execution of the subsystem application 330 by the processor 302 may result in control signals being sent to any field devices 112 that may be coupled to the field controller 110 via the I/O module 306 of the field controller 110. Execution of the subsystem application 330 may also result in the processor 302 receiving status signals and/or other data signals from field devices 112 coupled to the field controller 110 and storage of associated data in the memory 304.

The I/O module 306 may comprise one or more input/output circuits that are configured to communicate directly with field devices 112. Thus, for some embodiments, the I/O module 306 comprises analog input circuitry for receiving analog signals and analog output circuitry for providing analog signals.

The communication module 308 is configured to provide communication with the field panel 108 corresponding to the field controller 110 and other components on the FLN 124, such as other field controllers 110. Thus, the communication module 308 may comprise a port that may be coupled to the FLN 124. The port may include an RS-485 standard port circuit or other suitable port circuitry.

The power module 312 may be configured to supply power to the components of the field controller 110. The power module 312 may operate on standard 120 volt AC electricity, other AC voltages, or DC power supplied by a battery or batteries.

As discussed above, in commercial buildings and other facilities, the HVAC equipment should be maintained regularly. Early replacements and extra maintenance will bring extra hardware/equipment and labor costs. Too little maintenance may compromise the health of the machines and their remaining useful life (RUL).

Standard corrective maintenance (CM) and scheduled maintenance (SM) methods are heuristic and imprecise. For example, application engineers may estimate the Mean Time to Failure (MTTF), Mean Time before Failure (MTBF) or Mean Time before Repair (MTBR) for new hardware either from the vendor's manual or from historical log data. The engineer then prescribes either the CM or SM approach.

Under the CM framework, engineers don't replace an equipment until it is already broken, either detected manually or automatically by a software system. The CM method may result in significant business costs and comfort loss, due to the equipment failures.

Under the SM framework, engineers periodically replace equipment, even if the equipment is still functional. Although this method can reduce possible down time, it is only applicable to low cost equipment, such as air filters. First, it is wasteful to replace functional hardware. Second, due to their probabilistic nature, it inaccurate to estimate the maintenance budget assuming the equipment always fail at the MTTF time. For example, if 100 valves are deployed together in a system, and each valve has a RUL of 20 years, it is not likely that all the 100 valves will die on the same day after 5 years. Instead, the valves will fail gradually follow certain distributions, such as Weibull distribution. Counterintuitively, there is small probability for a valve to fail within the first year. Therefore, proper maintenance planning should reserve enough budget for the first year as well. For reliable maintenance, facility managers (FM) and engineers need to determine RUL with higher accuracy than the SM framework In some maintenance analysis processes, based on sensor data and historical maintenance data, engineers diagnose the root cause of the equipment failure. Due to limited sensors in the HVAC industry, faults usually cannot be measured directly by sensors. Instead, engineers need to infer the root cause based on domain knowledge and experience.

A typical maintenance projection process may include a manual root-cause analysis in conjunctions with manual RUL and budget estimation, tracking such data as static failure rates in a spreadsheet. Current approaches are limited and ineffective since they do not incorporate a survival analysis in estimation of remaining useful life (RUL). As a result, the traditional maintenance budget estimation method is not accurate and the maintenance processes do not prevent high impact failures. Further, current techniques do not perform any comparison on the maintenance log data among similar equipment. As a consequence, the maintenance efficiency is not increasing over time.

Disclosed embodiments include automated processes for projecting maintenance requirements and costs using machine-learning techniques.

Disclosed embodiments can use "survival curves" for planned maintenance scheduling. Survival curves project the probability of survival or failure of a device over time.

Figure 4A:
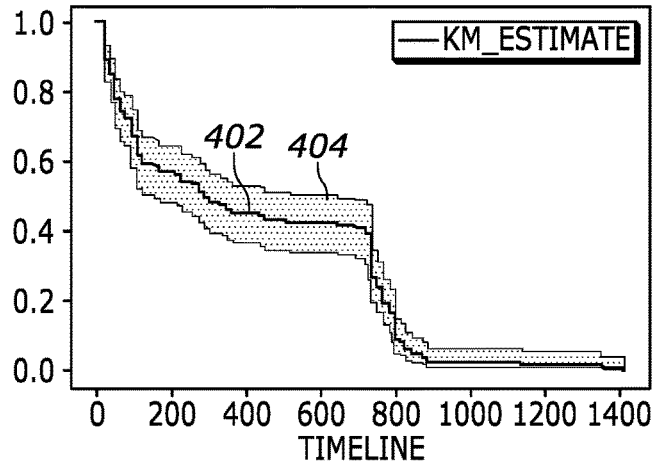
FIGS. 4A, 4B, and 4C illustrate examples survival curves in accordance with disclosed embodiments.
Figure 4B:
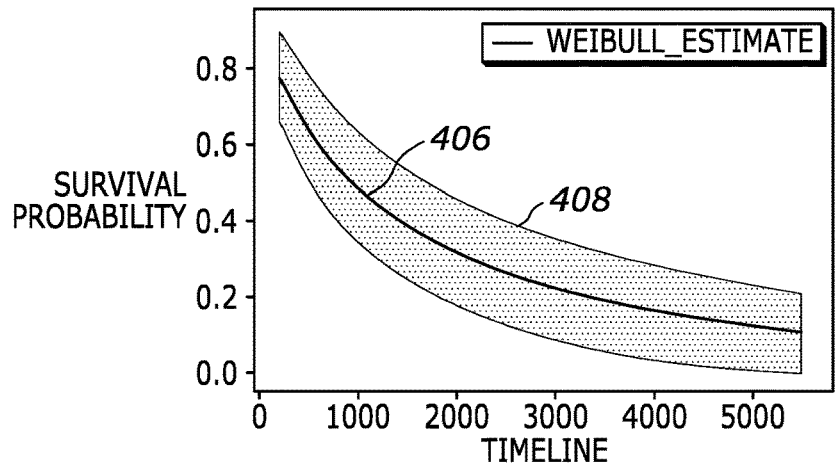
Figure 4C:
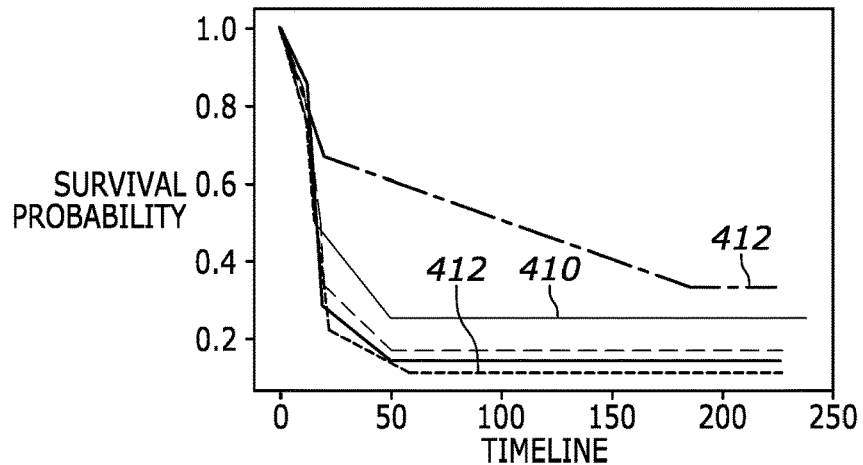

FIGS. 4A-4C illustrate examples survival curves, where the x-axis is the future time, measured in whatever interval is appropriate for a specific device, and the y-axis is the probability of that equipment survives until that time. This curve provides more information than the standalone RUL number.

FIG. 4A is an example of a survival curve 402 for non-parametric survival analysis using the known Kaplan-Meyer estimate, produced by using, for example, maintenance log data. In this figure, the band 404 reflects a 95% confidence interval with respect to the survival curve 402 at teach point in the timeline.

FIG. 4B is an example of a survival curve 406 for parametric survival analysis using a Weibull estimate as described herein, where band 408 reflects a 95% confidence interval with respect to the survival curve 402 at teach point in the timeline. Survival curve 406 can be produced by using, for example, maintenance log data.

FIG. 4C is an example of a survival curve 410 for similarity-based survival analysis. As described herein, a survival curve 410 can be determined using a plurality of actual history-based survival curves 412 based on a similarity of operating parameters and operating conditions, such as can be determined from sensor data (generally, device event data of other device). In this example, each curve 412 reflects a health index for a device, such as a VAV, operating under the similar conditions and with similar operating parameters, which as used to produce a survival curve 410. For example, a survival curve 410 for a specific VAV with specific operating parameters and conditions can be developed using a similarity analysis of other VAVs that operated under similar operating parameters and conditions, as reflected by curves 412. Using these techniques, survival curve 410 may be more accurate than a generic survival curve since a system as described herein can use machine learning to an analyze the actual survival curves 412 of similar devices and apply this analysis to produce a survival curve 410.

Disclosed embodiments perform predictive maintenance analysis for different types of HVAC equipment requirements. For example, various implementations can use equipment survival curve estimation to estimate the survival curve of a type of hardware based on historical maintenance data without requiring sensor data. Various implementations can use sensor-based survival curve estimation to estimate the survival curve of a piece of a specific hardware precisely using sensor data from that piece of hardware. Various implementations can perform budget estimation to estimate the total maintenance costs for a time period in the future, given such data as the costs of parts within the equipment.

Figure 5:
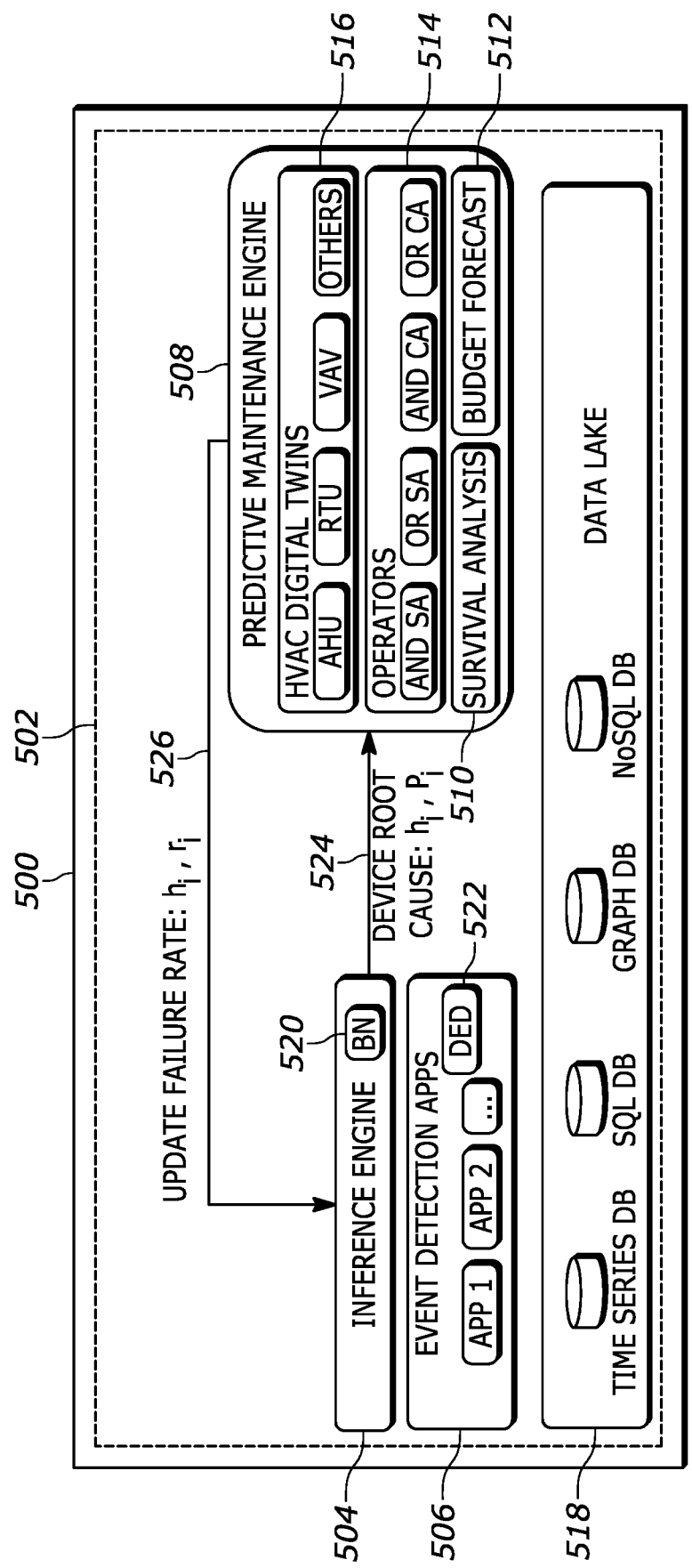
FIG. 5 illustrates an example of elements of a software architecture that can to perform processes as disclosed herein.

FIG. 5 illustrates an example of elements of a software architecture 502 that can be implemented in a BAS or other data processing system 500 to perform processes as disclosed herein. Data processing system 500 can be, for example, an example of one implementation of the site controller data processing system 102, a client station 106, a report server 104, or other client or server data processing system or controller configured to operate as disclosed herein. The software architecture 502 described here is exemplary and non-limiting; specific implementations may use alternate architectural components to perform similar functions, may call various components by different names, may combine or divide the various operations differently with respect to different components, or otherwise use a different logical structure to perform processes as described herein, and the scope of this disclosure is intended to encompass such variations.

Inference engine 504 determines the equipment faults, i.e., root causes, from events that occur in the system. Even detection applications (apps) 506 are used to collect system events based on sensor data. Inference engine 504 can include and base its decisions on a Bayesian network (BN) 520, described in more detail below.

The inputs to inference engine 504 from the event detection apps 506 can include sensor data on the k-th time instance, s[k], and expected failure rate of the same time, r[k], and other data, and can be generically referred to as device event data 522. For the i-th equipment, the failure rate is denoted as $r_i[k]$ for the hardware equipment $h_i$. The initial failure rate $r_i$ for a given hardware device may be stored or manually input into the inference engine 504, in some cases, and can later be updated by the predictive maintenance engine 508 as described below.

The output of the inference engine 504 can include the probability, $p_i[k]$, of failure of the k-th time instance (either a current or future time instance) for the equipment $h_i$. For simplicity, $p_i$ is used herein when the time k is obvious. The root causes, failure probabilities, and other outputs of the inference engine 504 can be generally referred to as root cause fault data 524.

Predictive maintenance (PM) engine 508 uses a survival analysis to calculate the probability of failure $p_i[k]$ for a hardware equipment $h_i[k]$ at the k-th time instance. For simplicity in this description, k is ignored when there is no misunderstanding on the time. The PM engine 508 calculates the failure rate $r_i$ of equipment $h_i$ at the same time instance. The failure rate $r_i$ of equipment $h_i$ and any other updated data produced by the by the PM engine 508, collectively referred to as updated failure data 526, can then be fed back to inference engine 504 to refine the root cause analyses.

PM engine 508 can include a survival analysis component 510. Survival analysis component 510 can generate survival curves, as shown in FIGS. 4A-4C, from historical data. Note that either the output (such as survival curves 402, 406, 410) or the processes performed by survival analysis component 510 may be referred to generically as the "survival analysis." Note also that, as described herein, generating curves can include actually generating curves that can be graphically displayed to a user and as reflected in the example figures below, but can also include simply generating the data and/or formulas need to reflect such curves, whether or not a graphic of the curve is ever generated or displayed.

Figure 6:
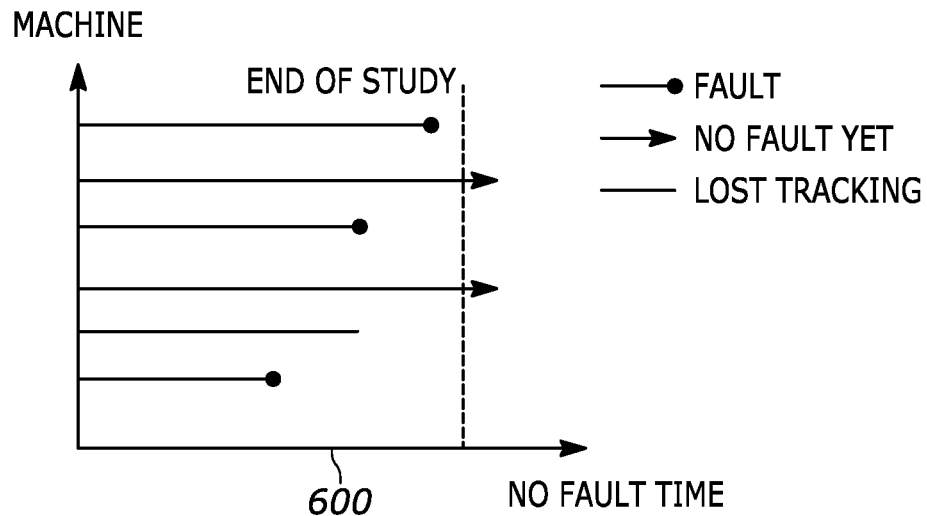
FIG. 6 illustrates a non-limiting example of historical data in accordance with disclosed embodiments.

FIG. 6 illustrates a non-limiting example of historical data 600 that can be used in various embodiments as input data for the survival analysis. In this example, data from multiple machines/devices is shown, with line data indicating lost tracking (plain line with no terminus), that a fault has occurred and when (line terminating in point indicating when fault occurred), and no fault yet (line with arrow indicating that the device is still performing normally). Each line in the line data can be associated with a specific machine or device identifier. Of course, this exemplary illustration does not limit how such data could be recorded, stored, or displayed. The historical data can include any number of samples, including data for hundreds or thousands of devices.

Returning to FIG. 5, PM engine 508 can include a budget forecast component 512. Budget forecast component 512 generates maintenance cost curves and cost analyses from the survival curves and/or other data.

Figure 7:
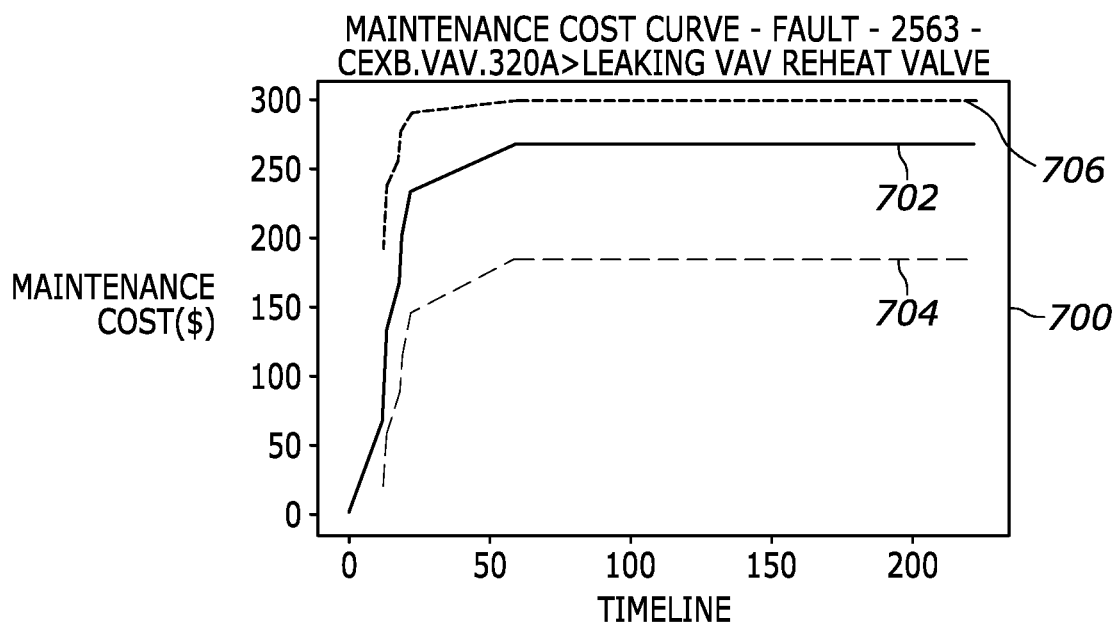
FIG. 7 illustrates a non-limiting example of maintenance cost curves in accordance with disclosed embodiments.

FIG. 7 illustrates a non-limiting example of maintenance cost curves that can be produced in various embodiments as an output of the budget forecast component 512. FIG. 7 illustrates an example of an estimated maintenance cost projection 700 that can be produced by a system as disclosed herein, graphing the maintenance cost (y-axis) over time (x-axis) for an example VAV reheat valve. In this figure, maintenance cost curve 702 shows the expected cost for the VAV reheat valve at each point in its lifespan, as measured against its total replacement cost of $300. Curve 704 reflects a lower-bound 95% confidence survival curve, and curve 706 reflects a higher-bound 95% confidence survival curve.

Returning to FIG. 5, PM engine 508 can operate using a number of unique operators 514 for survival analysis (SA) and cost analysis (CA). PM engine 508 can use "AND survival analysis (AND SA)", "OR SA", "AND cost analysis (AND CA)" and "OR CA" operators, where the AND SA or OR SA operators specify survival relationships between the multiple devices for a higher-level system that aggregates those devices. For the SA operators, the PM engine 508 combines the survival curves of individual components to represent a larger device comprised of the individual components. Based on device cost and the survival curve, the CA operators forecast the life cycle maintenance costs of those devices.

The "AND SA" operators are applicable to devices that require all components to work properly; that is, if any of the "ANDed" devices fail, the system fails. The "OR SA" operators are designed for the cases if one component works, then the whole device is functional. Of course, AND and OR are used as exemplary operators in this discussion, and various implementations may use different terms to accomplish the same aggregation functions. AND CA and OR CA reflect cost analyses based on the AND SA and OR SA survival relationships.

PM engine 508 can use digital twins 516, which are HVAC digital twins in this example. As used herein, a digital twin refers to a computerized (or digital) model of a physical asset/device and/or process. The digital twin can receive data, such as sensor data, representing real-time or archived information about the physical asset, and can be used to model the behavior and response of the "twinned" physical asset.

In specific implementations, the HVAC digital twins 516 can include digital twins for such elements as an air handling unit (AHU), a roof-top unit (RTU), a variable air volume (VAV) unit, and others, including subsystems or supersystems of these units, any of which can be considered a physical device (such as a field device 112). Digital twins 516 can include software containers that aggregate SA and CA functions of smaller components to a larger device.

The PM engine 508 can read time-event tables from the data lake 518, described below, or other source, then calculate survival curves (SCs) such as those illustrated in FIGS. 4A-4C.

Figures 8, 9:
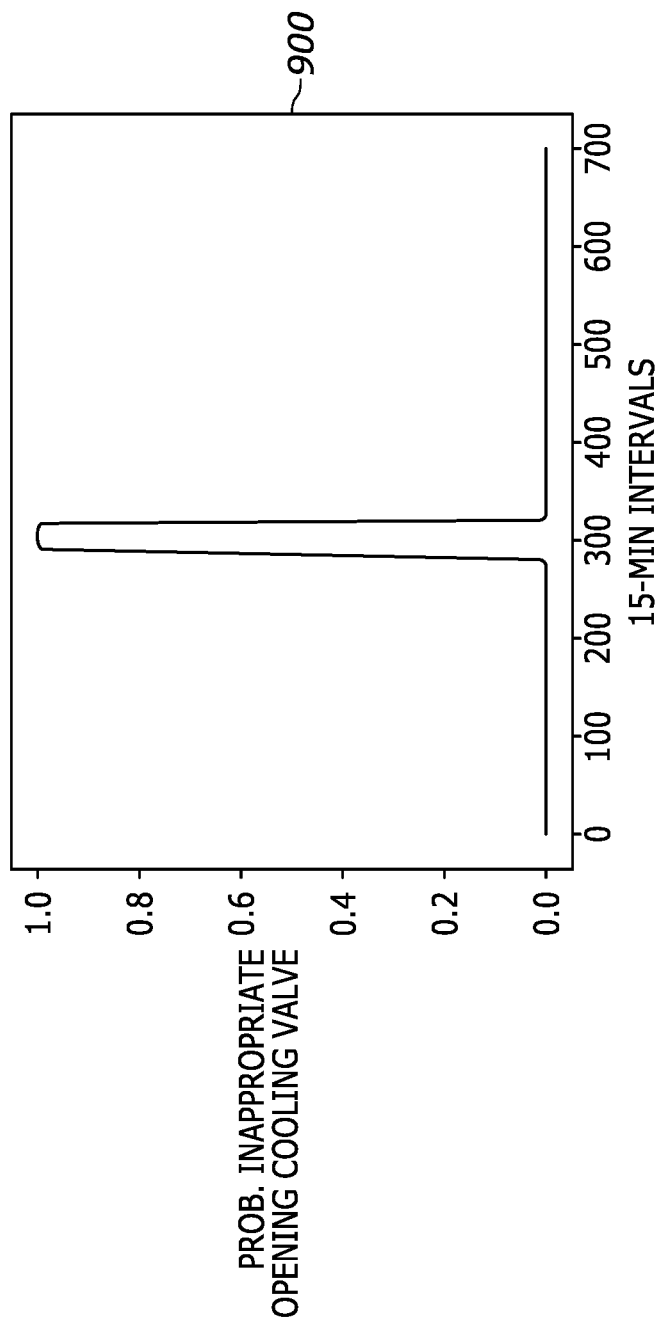
FIG. 8 illustrates an example of a time-event table that can be used in accordance with disclosed embodiments.
FIG. 9 illustrates an example output of inference engine in accordance with disclosed embodiments.

FIG. 8 illustrates an example of a time-event table 800 that can be used in accordance with disclosed embodiments. The example of a time-event table includes an event column to indicate whether an abnormal event is detected or not, along with other information such as identifying the time and date of the event, the device and site that detected the event, and a probability value. Such a table could include any other relevant information, such as a duration column to store the how long a given event has lasted.

Using this example, which shows data recorded on Oct. 1-2, 2019, a survival curve generated shortly thereafter would indicate that the replaced Valve 1 is not yet broken, and it is a "right-censored" record since its real lifetime is not yet known. The old Valve 1 broke on Oct. 1, 2019, and its lifetime is already measured, which is referred to herein as "left censored." The values in the "probability" column can be probabilities calculated, for example, from the Bayesian network(s) 520 if the associated value in the "manual" column is "no." If the entry in the "manual" column is "yes" then the probability number is always 100, meaning the result is verified by experts, i.e., application engineers. The use of the BN in various embodiments is described in more detail below.

Data lake 518 represents the data repository layer that aggregates multiple databases of different types. Such databases can include, for example, time-series databases, SQL and non-SQL databases, graph databases, and any other databases or repositories as may be useful to perform processes as described here. In particular, such data as access runtime and maintenance log data and the time-event tables described above can be stored in data lake 518.

FIG. 9 illustrates an example output 900 of inference engine 504, where the y-axis is $p_i$ (representing, in this example, probability of a failure in a cooling valve by inappropriate opening) and the x-axis is time.

Disclosed embodiments can employ probabilistic parametric and non-parametric methods to estimate the survival curve(s) from the time-event table. The system can apply the time-event table, sensor data, and output of the BN to a probabilistic similarity-based process as described herein to estimate the survivability curve of an individual device, such as illustrated above with respect to FIG. 7, such as based on a similarity between the device event data corresponding to a specific device being analyzed and device event data of other devices. From the survivability curve and cost of the device, the system can then also estimate the future maintenance costs of one or a cluster of devices.

As described above, inference engine 504 can include a Bayesian network 520. Disclosed embodiments can combine the BN of the inference engine 504 with the survival analysis 510 of the predictive maintenance engine 508 for continuous machine learning. To accomplish this, in some embodiments the system 500 uses a novel time-event table augmentation process to connect the outputs from the BN of inference engine 504 to the SA 510.

In a traditional SA, the inputs to the survival analysis process is limited to deterministic data. However, in disclosed embodiments, the output of BN 520 can indicate a probability of failure as illustrated in the time-event tables of FIG. 8 and FIG. 11. In FIG. 8, data from multiple equipment are mixed together in a single time-event table.

Figures 10, 11:
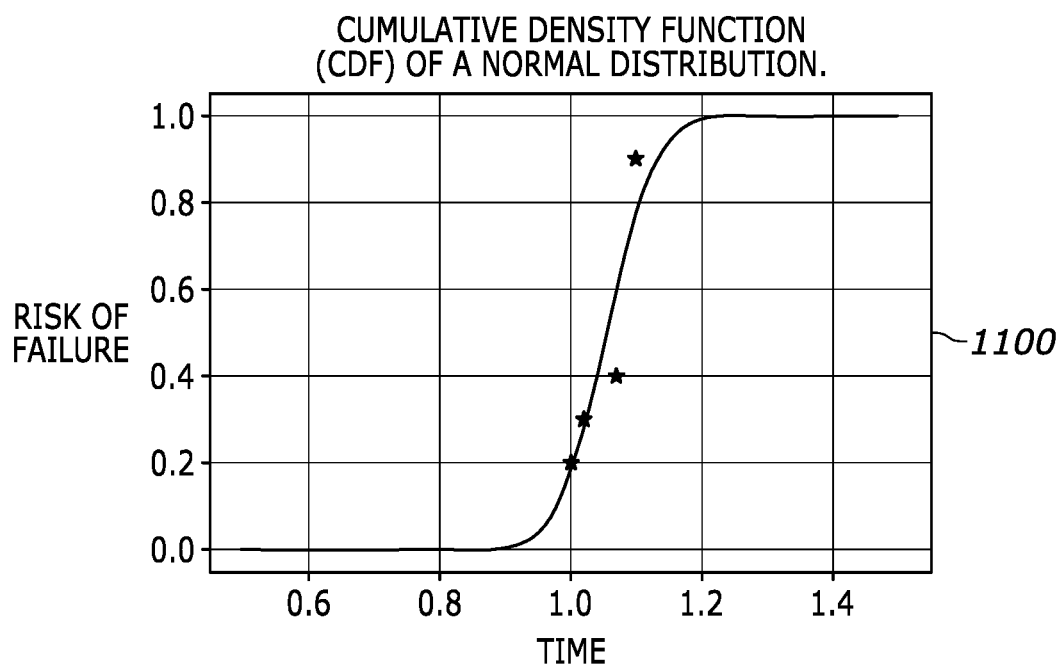
FIG. 10 illustrates an example of a normalized time-event table for a single device
FIG. 11 illustrates an example of a fitting sample in accordance with disclosed embodiments.

FIG. 10 illustrates an example of a normalized time-event table for a single device. After we extract the information of one equipment, the system can produce time-event table 1000, where the BN may detect faults several times with different probability. For stable regression, the system can normalize the fault time to a fixed range, which is 1.0 and 1.1 in this example. The exact range is can be selected as necessary and is not intended to be limiting to this disclosure.

The system can then fit the data with a selected distribution, such as a normal distribution, as illustrated in FIG. 11

FIG. 11 illustrates an example of fitting sample by a cumulative density function of a normal distribution in a graph 1100 showing risk of failure over time, corresponding to normalized time-event table 1000. The Probability Density Function (PDF) of the normal distribution in this example is:

$$y = f(x) = \frac{1}{\sqrt{2\pi\sigma^2}} e^{-\frac{(x-\mu)^2}{2\sigma^2}}$$

This equation shows that variable y is subjected to normal distribution, where x is the input and y is the output; σ and μ are standard deviation and mathematic expectation, respectively; and e is Euler's number.

The associated cumulative density function (CDF) $y_2$ or $f_c(x)$ is:

$$y_2 = f_c(x) = \frac{1}{2}\left(1 + erf\left(\frac{x-\mu}{\sigma\sqrt{2}}\right)\right)$$

where σ and μ can be calculated by a nonlinear regression method. Note that the normal distribution example used here is only one possible distribution out of many alternative distributions that can be used in particular implementations. In this equation σ and μ are standard deviation and mathematic expectation as defined as above, and erf represents the known "error function" in statistical mathematics, described at time of filing at en.wikipedia.org/wiki Error function.

The system can then apply the normalized time-event table 1100 of FIG. 11 and fit the unknown parameters using a common curve fitting function. In this example, σ=0.0594 and μ=1.0588 after the regression. Based on these fitted parameters, the system can generate many samples that follow this distribution using a statistical "boot strapping" technique.

Figures 12, 13:
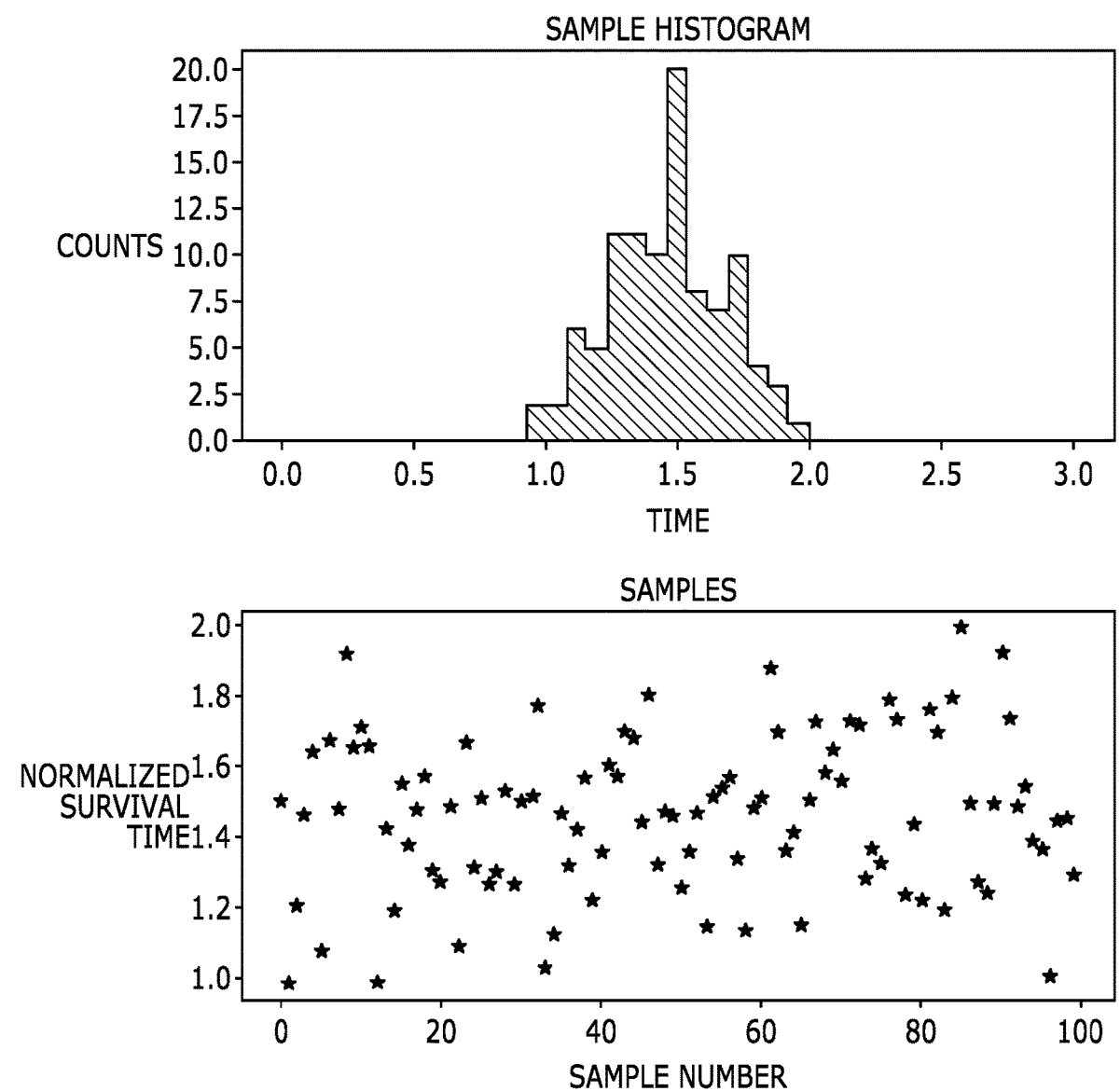
FIG. 12 illustrates an example of sample generation in accordance with disclosed embodiments.
FIG. 13 illustrates an example of an augmented time-event table in accordance with disclosed embodiments.

FIG. 12 illustrates an example of this sample generation based on the fitting distribution, in accordance with disclosed embodiments.

The system can then replace the data in the normalized time-event table with the generated sample data. In this example, the data in normalized time-event table 1000 of FIG. 10 is replaced with the generated data as shown in FIG. 12. The output is a list of normalized failure times, referred to as an "augmented time-event table."

FIG. 13 illustrates an example of an augmented time-event table 1300 in accordance with disclosed embodiments. Augmented time-event table 1300, in this example, just has one column with the normalized failure time of the equipment and the probability column is removed. Since the probability is all 100% after the augmentation, the system can process the data using standard deterministic survival-analysis tools.

The system can also perform probabilistic survival analysis. Using the augmented time-event table, the system can convert probabilistic output from the BN 520 to deterministic data. Based on this, the system can also transform all standard deterministic SA to probabilistic SA data.

A system as disclosed herein can perform a probabilistic non-parametric survival analysis process. When a survival curve is not known, the system can fit maintenance log data with non-parametric SA methods, such as the Kaplan-Meier estimator, which generates a survival function S(t) as $$S[k] = \prod_{i:k_i \leq k} \left(1 - \frac{d_i}{n_i}\right)$$

where $k_i$ is the time when at least one virtual event (such as a device failure) happens occurs in a time-event table or normalized time-event table, $d_i$ is the individual device known to have survived up to time $t_i$, and $n_i$ is the population size.

A system as disclosed herein can perform a probabilistic parametric survival analysis process. Where such parameters as MTTF and/or failure rate F for a device are known, the system can use them to fit in the structured survival curves, such as the Weibull distribution, f[k], defined as:

$$W[k] = \frac{b}{a}\left(\frac{k}{b}\right)^{b-1} e^{-\frac{k^b}{b}}$$

where f[k] equals W[k] and MTTF, or F, is $$MTTF = a\Gamma\left(1 + \frac{1}{b}\right).$$

The Weibull distribution is a method to describe the failure rate of a device, where a represents a shape parameter, b represents a scale parameter, and k represents an input variable. Weibull distribution is understood by those of skill in the art and is described, at time of filing, at en.wikipedia.org/wiki Weibull distribution. For computing F, the a and b parameters are the same as those in the definition of Weibull distribution. The Gamma function Γ(x) is a standard math function, described, for example, at time of filing at en.wikipedia.org/wiki/Gamma_function.

If the failure rate, F, is defined as a constant, then b=1 and the system uses $$a = \frac{MTTF}{2}.$$

The parametric SA,W[k], is computed by $$W[k] = \frac{2}{MTTF}e^{-k}.$$

If F[k] is not a constant, the system uses $$F[k]=1-\Sigma_{n=0}^{k}W[n].$$

With a curve fitting library, such as the Python Scipy curvefit( ) function, the system can find a, b with non-linear optimization using:

$$a, b = \mathrm{argmin}\sum (F[k](a, b) - R[k])^2 + \left(MTTF - a\Gamma\left(1 + \frac{1}{b}\right)\right)^2$$

where R[k] and MTTF are, for example, from the manufacture of the equipment.

A system as disclosed herein can perform a probabilistic similarity-based survival analysis (SSA) process. The SSA process can be more accurate than other methods, because it considers sensor data and so has more information as the input.

Figure 14A:
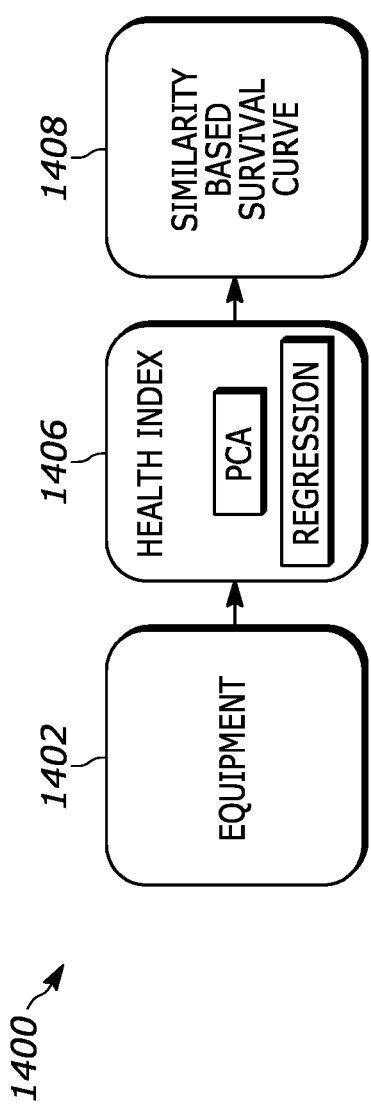
FIGS. 14A and 14B illustrate similarity-based survival analysis processes in accordance with disclosed embodiments.
Figure 14B:
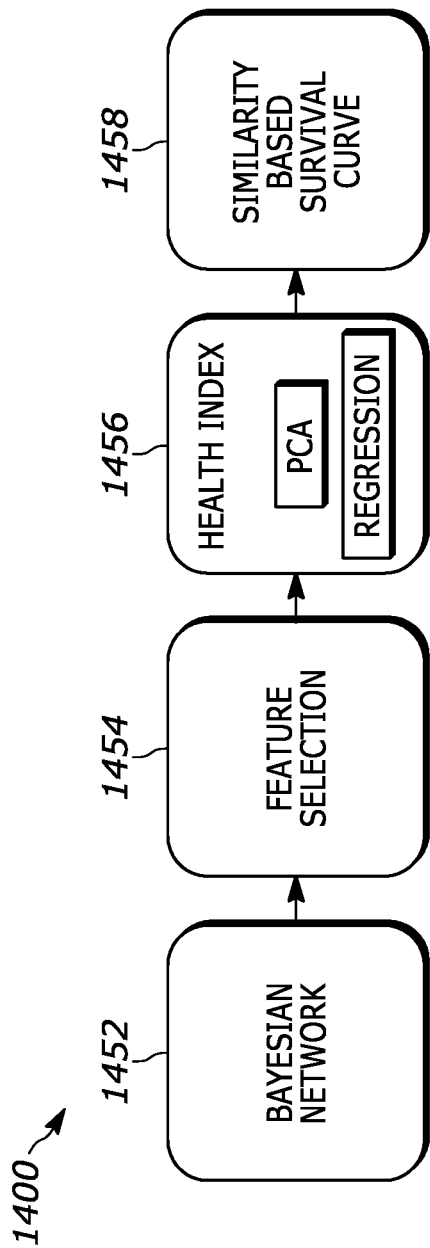

FIGS. 14A and 14B illustrate similarity-based survival analysis processes in accordance with disclosed embodiments.

FIG. 14A illustrates an SSA process 1400 that relies on sensor data in accordance with disclosed embodiments. In this figure, hardware 1402 provides sensor data that is used to build a health index 1406, which reflects a survival probability for the device at specific points in the lifecycle of the device. Based on the sensor data, the system can use such techniques as principal component analysis (PCA) and regression analysis to build the health index 1406. From the health index 1406, the system can produce the similarity-based survival curve 1408 by using data from similar devices, processes, and contexts. That is, for example, the similarity-based survival curve can be generated based on the similarity between the device event data corresponding to the device and device event data of other devices, using the techniques described herein. Health index 1406 indicates the "instantaneous" survival probability of the device at specific points in time, while survival curve 1408 represents the overall trend of the health index data when combined with data from similar devices, processes, and contexts.

FIG. 14B illustrates an SSA process 1450 that combines sensor data or other device event data with the output of a BN in accordance with disclosed embodiments. In this figure, BN 1452 provides data such as features, events, and probability of failure p$_i$[k] to feature selection 1454. Feature selection 1454 selects among this data according to the survival analysis being performed and provides selected data to build health index 1456. Based on the selected data, the system can use such techniques as principal component analysis (PCA) and regression analysis to build the health index 1406. From the health index 1406, the system can produce the similarity-based survival curve 1408 by using data from similar devices, processes, and contexts. Note that the BN 1452 includes and incorporates sensor data.

As an example, the system can perform a similarity-based SA to a VAV box water valve. After the BN detects abnormal behaviors from the VAV, the system can forecast the remaining useful life of the VAV. In this example, in feature selection 1454, the system selects VAV data, including sensor data, from the VAV at issue. The system uses PCA and regression functions, such as from a machine learning library.

Figure 15A:
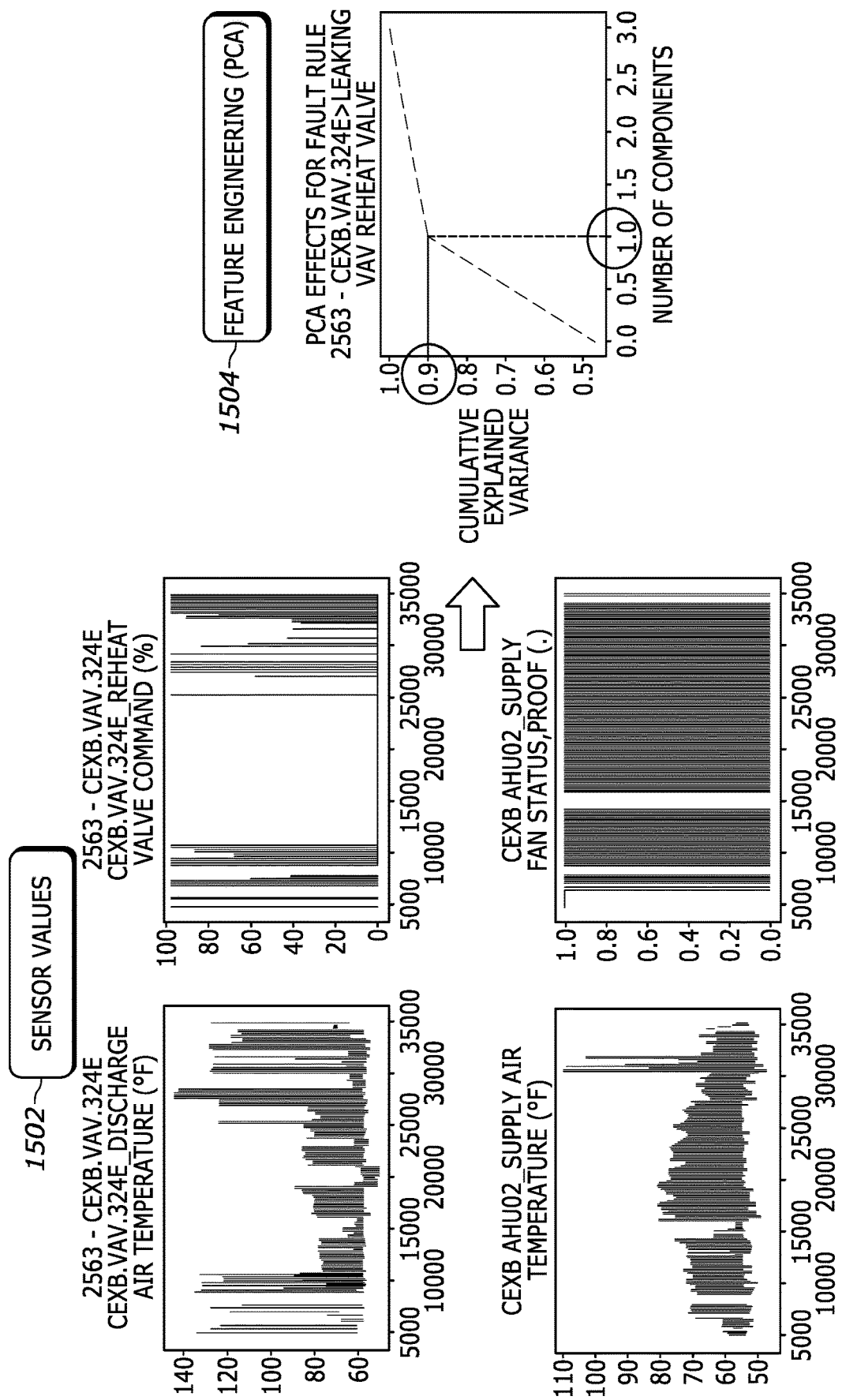
FIGS. 15A and 15B illustrate the use of PCA on sensor values in accordance with disclosed embodiments.
Figure 15B:
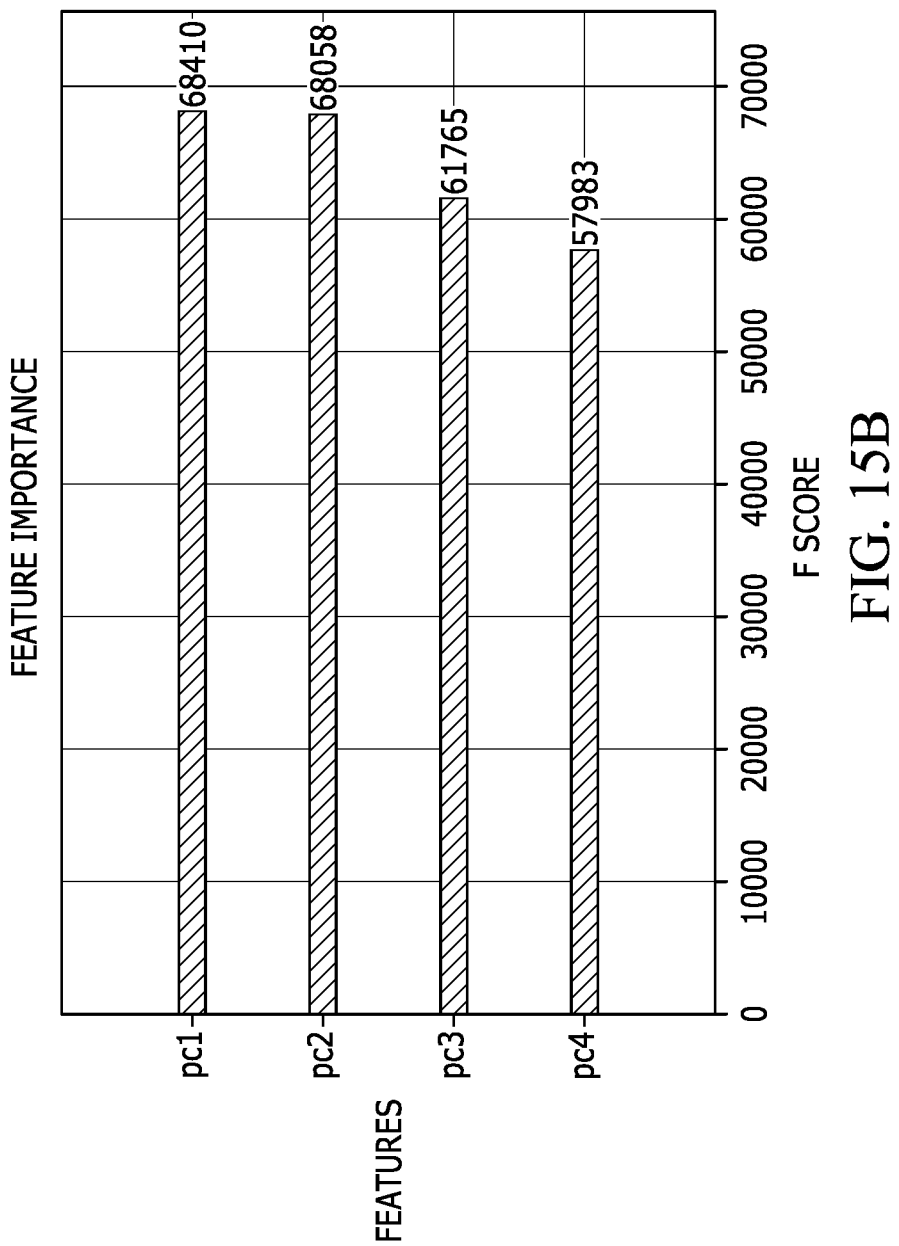

FIGS. 15A and 15B illustrate the use of PCA on sensor values in accordance with disclosed embodiments, for section of key features (sensor values or data). As shown in FIG. 15A, 4 sensor values 1502 are used as the input features (in this example, the discharge air temperature, supply air temperature, reheat valve command, and supply fan status). The system can then fit a health index from these readings using, in this case, a PCA feature engineering process 1504. Assuming the health index h[k] is a linear combination of feature signals s[k], then h[k] A s[k].

In this example, the system uses four features for the VAV valves. This process is applicable to mechanical hardware devices in general. The sensor and feature inputs are different with respect to different devices. With singular value decomposition (SVD), $$A=S\Sigma D$$

where S and D are unitary matrices and Σ is a diagonal matrix with singular values on its diagonal.

FIG. 15B illustrates the relative feature importance PCA of sensor data (pc1-pc4) for VAV reheating water valve remaining useful life, for this example. The process can eliminate or disregard features with small singular values. For this case, none of the features can be removed, since none of feature scores in FIG. 15B are close to 0.

FIG. 4C, described above, illustrates a resulting probabilistic similarity-based survival curve 410 in accordance with disclosed embodiments, for the VAV reheating valve example. As illustrated in FIG. 4C, a probabilistic similarity-based survival analysis is applied to a VAV reheat valve. The x-axis for survival curve 410 is time. The y-axis is the health index (survival probability) for survival curve 410. Due to different usage patterns, some valves degrade faster than others, as illustrated by other curves 412.

Different regression methods can be used in different implementations. A product such as the XGBOOST open-source software library can be used due to its robust performance, ability to achieve high precision and it can reduce false positives and false negatives, scalability for the data by performing parallel computing on the random forest estimation, and ability to prevent overfitting in training data by using the random forest structure, early stopping, and bagging techniques.

Disclosed embodiments can perform a cost analysis (CA) based on survival analysis. Given the device cost and the survival curve of the device, the system can estimate the maintenance cost, C[k]. For facility managers and other individuals, it can be important to reserve enough maintenance budget at the beginning of a fascial year. It is not effective to simply reserve the same amount of funds each year, since as the devices age, higher maintenance costs are expected until the old devices are replaced by new ones.

Figure 16:
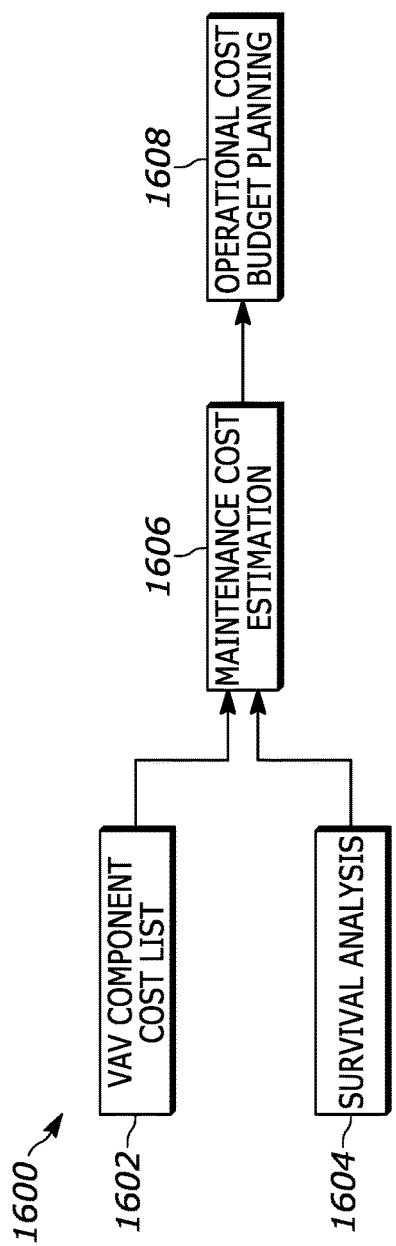
FIG. 16 illustrates an example of a cost analysis process in accordance with disclosed embodiments.

FIG. 16 illustrates an example of a cost analysis process 1600 in accordance with disclosed embodiments. In such a process, a component cost 1602 and survival analysis 1604 for that component can be used to produce a maintenance cost estimation 1606 (also referred to as a cost analysis 1606). Maintenance cost estimation 1606 can then be used for operational cost budget planning 1608.

For the survival analysis 1604, in one example, if the equipment cost is c, then the non-parametric SA can be computed as $$C[k]=c\cdot S[k]$$

and the parametric SA can be computed as $$C[k]=c\cdot W[k]$$

In this process, define $\hat{S}[k]$ as the generic SA, i.e., $\hat{S}[k]=S[k]$ for non-parametric SA and $\hat{S}[k]=W[k]$ for parametric SA. Then, $C[k]=c\cdot\hat{S}[k]$.

Figure 17B:
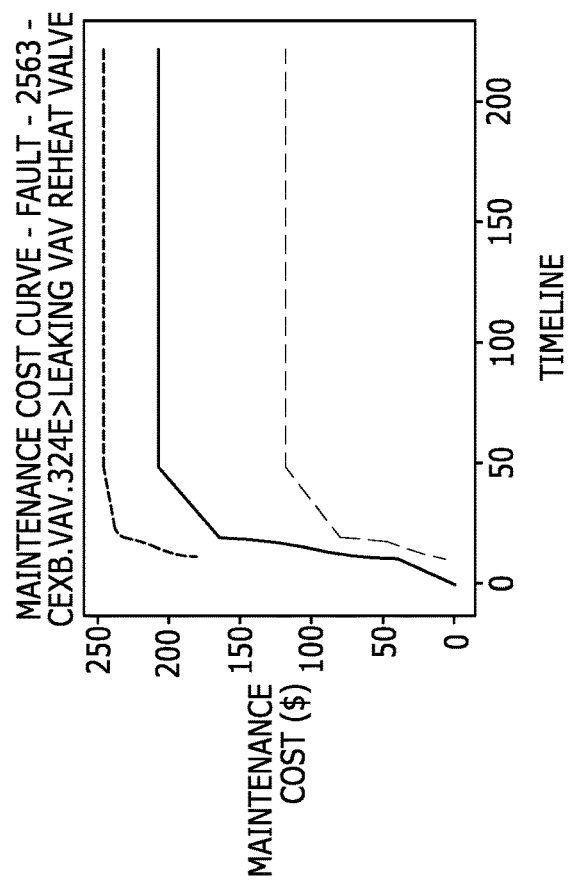
FIGS. 17A and 17B illustrate an example of computing a cost analysis from a survival analysis in accordance with disclosed embodiments.
Figure 17A:
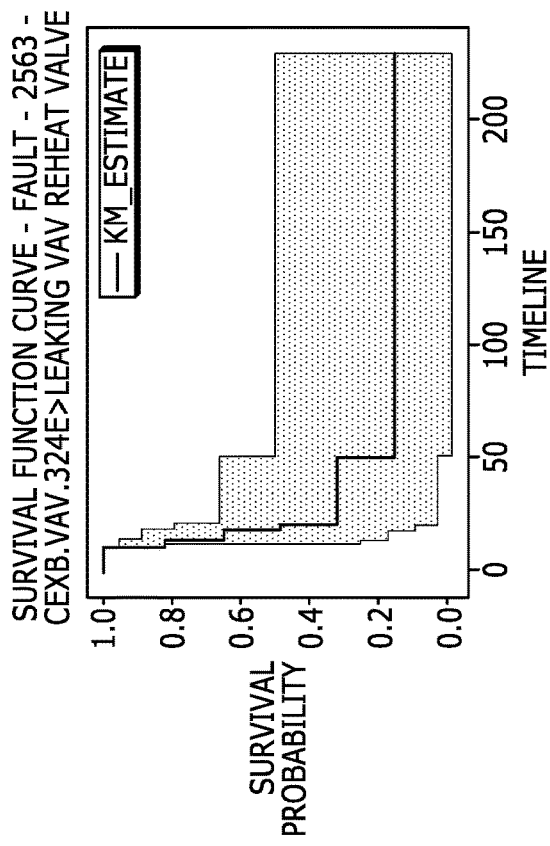

FIGS. 17A and 17B illustrate an example of computing a cost analysis from a survival analysis in accordance with disclosed embodiments. FIG. 17A illustrates an example of a survival analysis for a leaking VAV reheat valve; FIG. 17B illustrates a corresponding example of maintenance cost curves. FIG. 17B illustrates the same example as FIG. 7, above.

For budget planning, the total cost at a particular time can be important. For example, it may be valuable to know C[52], where 52 is a week number, as the estimated cost of the next one year.

Disclosed embodiments can perform an aggregation process to combine survival analysis and cost analysis from each component to the whole system using the AND/OR operators. The SA and CA of a large device or a set of devices (such as building cluster) are denoted as $\hat{S}[k]$ and $C[k]$, respectively. The SA and CA of the i-th component in the large device or the device set are $\hat{S}_i[k]$ and $C_i[k]$, respectively.

If a device requires several components all work properly, then the SA or CA of the whole system can be calculated with the AND operator for SA or CA. The AND SA operator is defined herein as $$\hat{S}[k]=AND\_SA(\hat{S}_1[k],\hat{S}_2[k],\ldots,)$$

where $$\hat{S}[k]=\Pi_{i=1}^{N}\hat{S}_i[k]$$

Similarly, the AND CA operator is defined herein as $$\hat{C}[k]=AND\_CA(\hat{S}_1[k],\hat{S}_2[k],\ldots,)$$

where $$\hat{C}[k]=c\Pi_{i=1}^{N}\hat{S}_i[k]$$

The OR SA operator is defined herein as $$\hat{S}[k]=OR\_SA(\hat{S}_1[k],\hat{S}_2[k],\ldots,)$$

where $$\hat{S}[k]=1-\Pi_{i=1}^{N}(1-\hat{S}_i[k])$$

The OR CA operator is defined herein as $$\hat{C}[k]=OR\_CA(\hat{S}_1[k],\hat{S}_2[k],\ldots,)$$

where $$\hat{C}[k]=c-c\Pi_{i=1}^{N}(1-\hat{S}_i[k])$$

Figure 18:
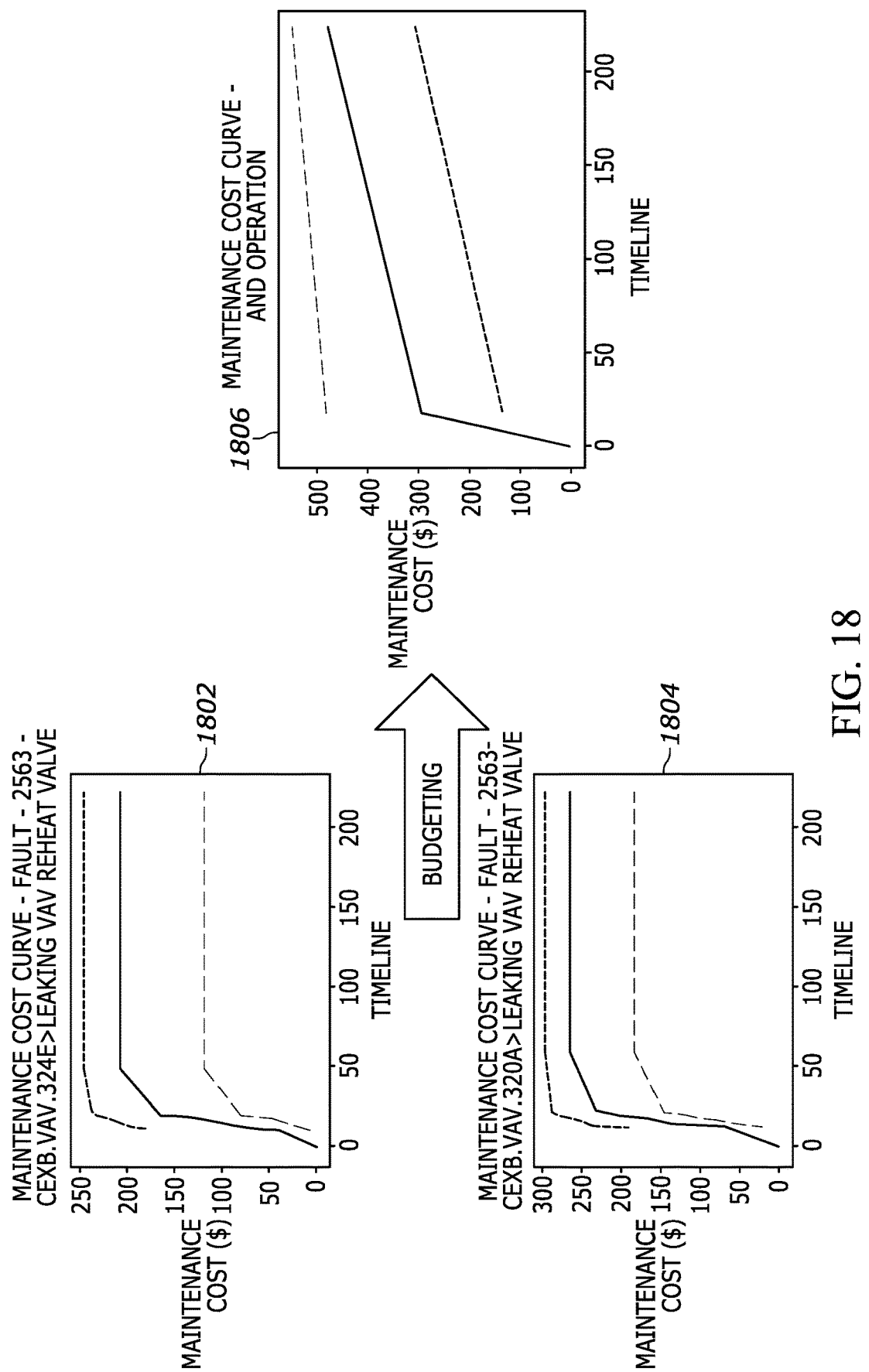
FIG. 18 illustrates an AND CA aggregation of maintenance cost curves in accordance with disclosed embodiments.

FIG. 18 illustrates an AND CA aggregation of maintenance cost curves in accordance with disclosed embodiments. In this example CA curve 1802 (for VAV 324E) is combined using the AND CA operation with CA curve 1804 (for VAV 320A) to produce CA curve 1806.

As illustrated in FIG. 18, the AND CA operation implies that if either VAV 324E and VAV 320A fail, a maintenance team would be required to repair the components. Therefore, the maintenance cost curve of AND operation merges and infuses the probabilities of both VAV's survival probabilities as maintenance cost.

In other examples, if a single component fails, and a second component must take up the "slack," then the individual survival curve for the second device may change because it is carrying an additional load. OR SA and OR CA aggregation techniques discussed herein can account for the interactions between component failures and changes to the survival curves.

The system can also determine confidence intervals associated for all maintenance cost curves to indicate the highest possible amount of money to spend and the lowest possible amount of the money spent on the maintenance cost. In this way, the aggregated maintenance cost curves, such as curves 1806, aid facility managers and other individuals to estimate the maintenance cost budget for the whole HVAC system with multiple VAVs.

Figure 19:
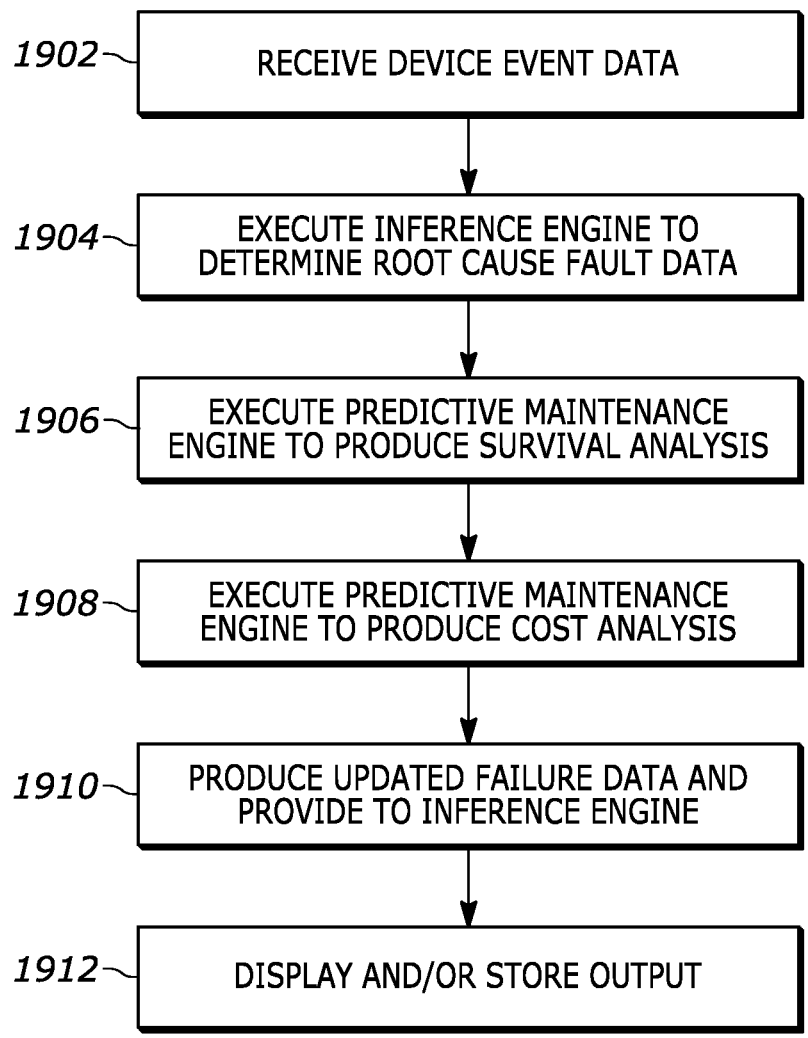
FIGS. 19 and 20 illustrate examples of processes in accordance with disclosed embodiments.

FIG. 19 illustrates a process in accordance with disclosed embodiments that can be performed, for example, by a data processing system, controller, or other processor in a BAS system or other system, or any combination of multiple such systems. The device executing such a process is referred to generically as the "system" below. Any or all of the features discussed herein or in the incorporated applications can be used in a process as described below.

The system receives device event data (1902). As used in this process, "receiving" can include loading from storage, receiving from another device or processes, receiving via an interaction with a user, or otherwise. In specific embodiments, the device event data is received, directly or indirectly, from one or more event detection applications that identify device or system events based on sensor data. The device event data can include, in some embodiments, sensor data for a device for a specific time instance and a failure rate for the device for the same time instance. The sensor data and failure rate can include historical data, such as runtime data and maintenance log data stored in a data lake repository. The devices can be, in a BAS implementation, any HVAC or other building device, and the sensor data can be any data received from a field device 112, field controller 110, or other device.

The system executes an inference engine to determine root cause fault data corresponding to the device event data (1904). The root cause fault data can include a probability of failure for the device for the specific time instance or for a future time instance. The inference engine can include and base decisions on a Bayesian network that associates device events with device faults. The inference engine can combine device event data with outputs of the Bayesian network to produce the root cause fault data. Known techniques for determining root causes of faults based on events can be used, and techniques such as those described in the patent applications incorporated herein can be used.

The system executes a predictive maintenance engine to produce a survival analysis for the device based on the root cause fault data (1906). The survival analysis can include one or more survival curves as disclosed herein. The predictive maintenance engine can use a digital twin of one or more devices to produce the survival analysis. The predictive maintenance engine can aggregate device data for the survival analysis using operators such as AND and OR operators to combine device survival analysis data. The predictive maintenance engine can be, for example, predictive maintenance engine 508 described above.

The survival analysis can include performing a probabilistic parametric survival analysis process, performing a probabilistic non-parametric survival analysis process, and/or performing a probabilistic similarity-based survival analysis (SSA) process. The survival analysis can include using a time-event table, a normalized time-event table, and/or an augmented time-event table to process the root cause fault data. In an SSA process, the system can also perform principal component analysis and/or regression analysis on selected device event data to build a health index representing the survival probability for a device. A singular value decomposition calculation can be performed as part of the principal component analysis. The survival analysis can include generating a normalized time-event table from a time event table using a cumulative density function and curve fitting and thereafter generating an augmented time-event table that replaces event time values and/or probability metrics with normalized time values.

The system can execute the predictive maintenance engine to produce a cost analysis corresponding to the device (1908). The predictive maintenance engine can aggregate device data for the cost analysis using AND and OR operators to combine device cost analysis data and can generate a cost analysis for an aggregation of multiple devices using AND CA or OR CA operators that based on survival relationships between the multiple devices.

The system produces updated failure data by the predictive maintenance engine, based on the survival analysis, and provides the updated failure data to the inference engine (1910). The inference engine can then use the updated failure data in subsequent root cause analyses to provide more accurate root cause fault data, creating an ongoing machine-learning process.

The system can output or display, to a user, the updated failure data, survival curves, survival analyses, costs analyses, or any other of the outputs described above, and/or can store or transmit such outputs as may be useful in a given implementation (1912). Further, as part of this step, the system can predict, schedule, or order the replacement of the physical device based on the survival analysis, including, in some cases, the survival relationships between multiple devices.

Figure 20:
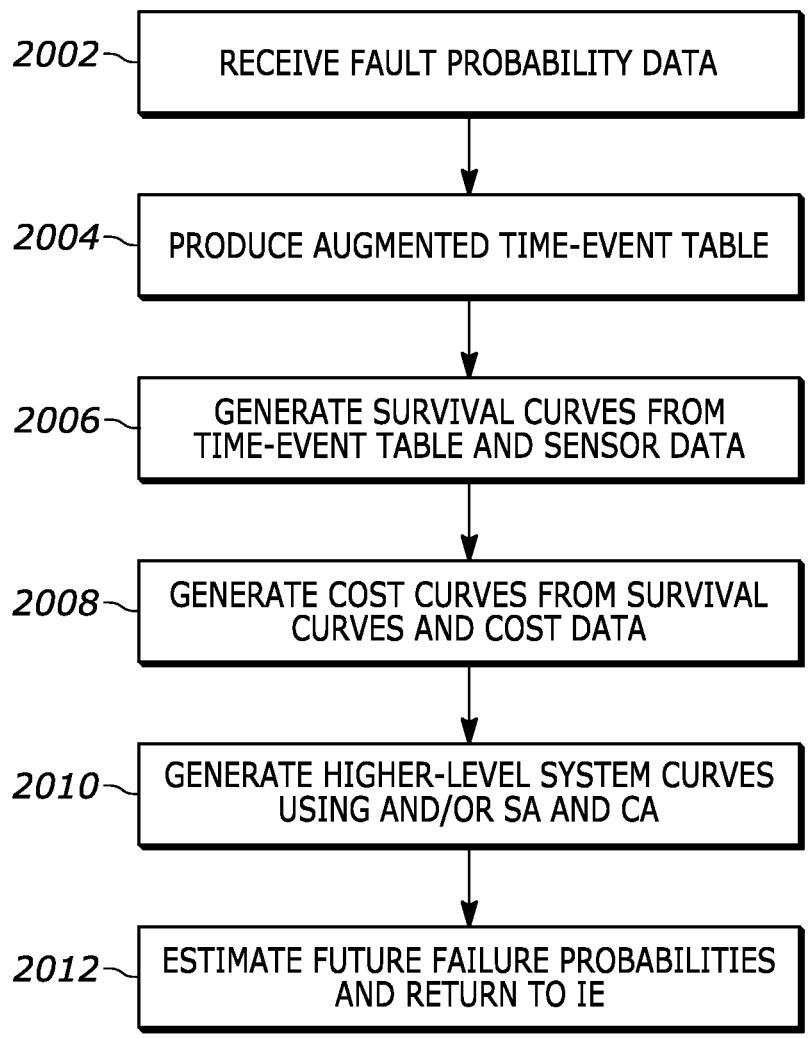

FIG. 20 illustrates a process in accordance with disclosed embodiments that can be performed, for example, by a data processing system, controller, or other processor in a BAS system or other system, or any combination of multiple such systems, operating as the predictive maintenance engine 508 described above or the predictive maintenance engine described in FIG. 19. The device executing such a process is referred to generically as the "system" below. Any or all of the features discussed herein or in the incorporated applications can be used in a process as described below.

The system receives fault probability data (2002). The fault probability data can be or correspond to, for example, the root cause fault data discussed above, for a device or component. The fault probability data can include, for example, the device of interest $h_i$, and its probability of fault, $p_i$, received from the inference engine.

The system produces an augmented time-event table according to the fault probability data (2004). This can be performed, for example, as described above with respect to FIGS. 10-14, to produce an augmented time-event table that replaces probability metrics with normalized time values for the device or component.

The system generates one or more survival curves for the device or component using the augmented time-event table (2006). This can include generating survival curves using a Kaplan-Meyer estimate as in FIG. 4A, using a Weibull estimate as in FIG. 4B, or using sensor data and operational parameters from similar devices to generate a similarity-based survival curve as in FIG. 4C. This can specifically include generating a similarity-based survival curve as described herein using the augmented time-event table and similarity between device event data corresponding to the device or component and device event data of other devices, such as other devices subject to the same operating conditions and parameters.

Processes 2002-2006 can be used, in some cases, to implement the process of executing a predictive maintenance engine to produce a survival analysis for the device based on the root cause fault data in 1906, above.

The system generates cost curves using the one or more survival curves (2008). The system can use the survival curve(s) for a device or component, combined with cost data for the device or component, to generate cost curves for the device or component. The cost curves can be, for example the cost curves illustrated above with respect to FIG. 7.

Process 2008 can be used, in some cases, to implement the process of executing the predictive maintenance engine to produce a cost analysis corresponding to the device in 1908, above.

The system can generate higher-level system curves using AND SA, OR SA, AND CA, and/or OR CA operators (2010). The higher-level system can be any aggregation of lower-level devices or components, such as an air handling system for a floor of a building, the HVAC system for an entire building, the physical plant for a campus, or otherwise. This can include generating survival curves for an aggregation of multiple devices using AND SA or OR SA operators that specify survival relationships between the multiple devices, and can include generating a cost analysis for an aggregation of multiple devices using AND CA or OR CA operators that based on the survival relationships between the multiple devices. The generated higher-level system curves can include survival curves and/or cost curves for the higher-level system. In this way, the system can predict maintenance issues, device failures, and associated costs for any combination of devices analyzed as described herein.

Process 2010 can be performed as part of executing a predictive maintenance engine to produce a survival analysis for the device based on the root cause fault data in 1906, above, and/or as a part of executing the predictive maintenance engine to produce a cost analysis corresponding to the device in 1908, above.

The system can estimate future failure rates for a device or component (2012). The system can then transmit the future failure rates to the inference engine. The future (predicted) failure rates $p_i[t]$ for a device $h_i$ can be estimated as described above using the generated survival curves for that device.

Figure 21:
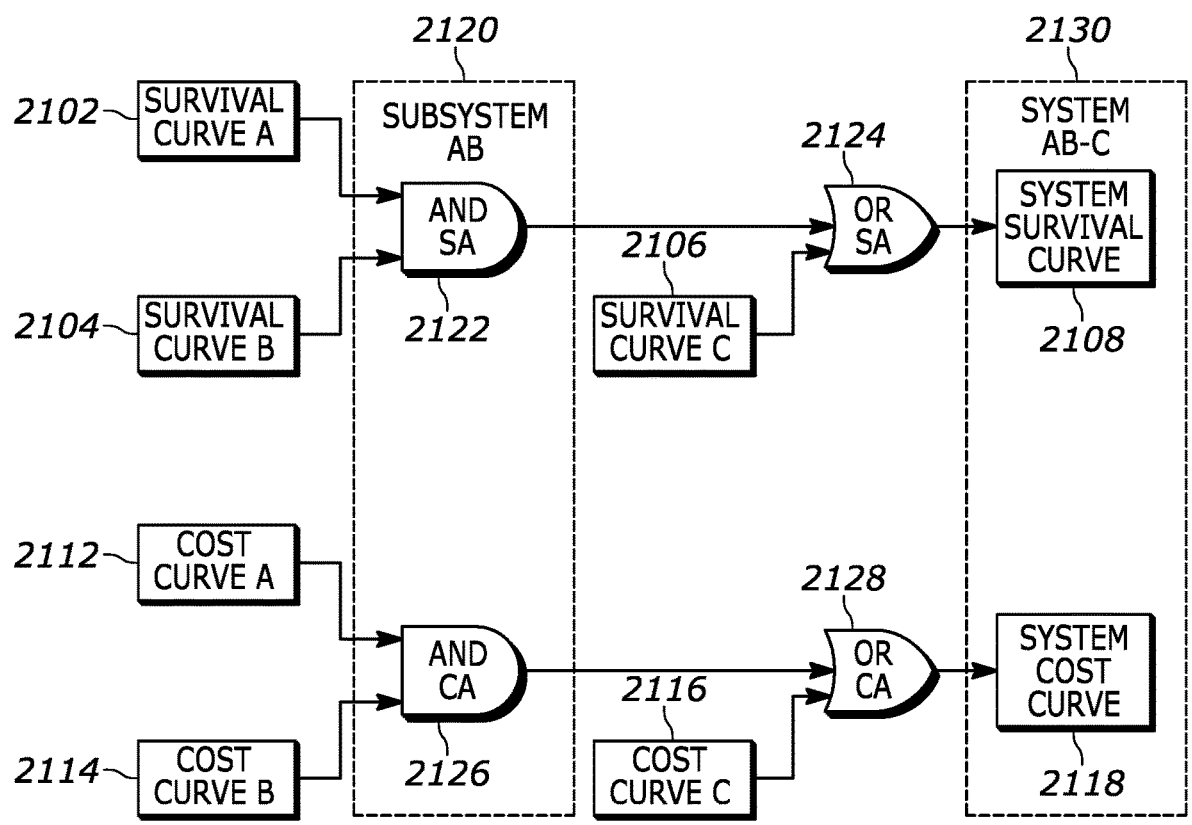
FIG. 21 illustrates an example of using logical operators as disclosed herein.

FIG. 21 illustrates an example of using logical operators as described herein. In this example, it is assumed that the system has already generated, as described above, certain survival curves and cost curves for various devices—survival curve A 2102 and cost curve A 2112 for device A, survival curve B 2104 and cost curve B 2114 for device B, and survival curve C 2106 and cost curve C 2116 for device C. In this example, consider that the operation of devices A and C are necessary and complementary to each other in a given subsystem AB 2120. If either device A or device C fails, the subsystem 2120 fails. AND SA 2122 reflects the aggregated survival curve of subsystem AB, combining survival curve A 2102 and survival curve B 2104 using AND SA 2122, showing the survival of both device A and device B predicts the survival of subsystem AB 2120.

Since cost curves are computed from survival curves, this also illustrates that the cost curve predictions of subsystem AB 2120 are the AND CA 2126 combination of cost curve A 2112 and cost curve B 2114.

Consider also that the survival of system AB-C 2130 requires either the survival of subsystem AB or the survival of device C. In this example, the system can use the OR SA 2124 combination of survival curve C 2120 with the AND SA 2122 results to produce system survival curve 2108, reflecting the survival of system AB-C 2130.

Since cost curves are computed from survival curves, this also illustrates that the cost curve 2118 predictions of system AB-C 2120 are the OR CA CA 2128 combination of cost curve C 2116 and AND CA 2126 cost curve produced from the combination of cost curve A 2112 and cost curve B 2114.

Figure 22:
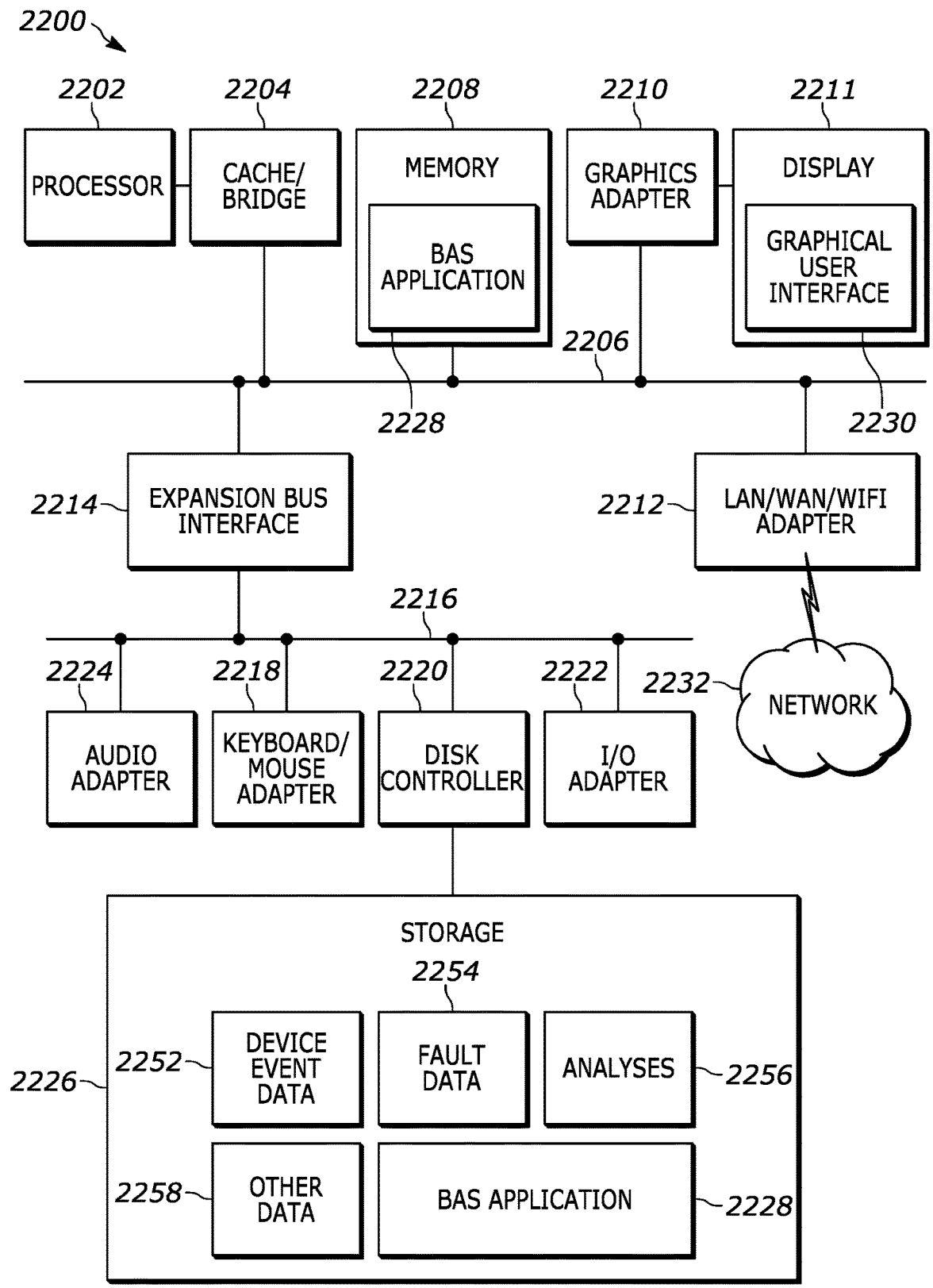
FIG. 22 illustrates a block diagram of a data processing system in which various embodiments can be implemented.

FIG. 22 illustrates a block diagram of a data processing system 2200 in which various embodiments can be implemented. The data processing system 2200 is an example of one implementation of the site controller data processing system 102 in FIG. 1 and of an implementation of a data processing system 500 in FIG. 5, and can be used as an implementation of other data processing systems configured to operate as described herein.

The data processing system 2200 includes a processor 2202 connected to a level two cache/bridge 2204, which is connected in turn to a local system bus 2206. The local system bus 2206 may be, for example, a peripheral component interconnect (PCI) architecture bus. Also connected to the local system bus 2206 in the depicted example are a main memory 2208 and a graphics adapter 2210. The graphics adapter 2210 may be connected to a display 2211.

Other peripherals, such as a local area network (LAN)/Wide Area Network (WAN)/Wireless (e.g. WiFi) adapter 2212, may also be connected to the local system bus 2206. An expansion bus interface 2214 connects the local system bus 2206 to an input/output (I/O) bus 2216. The I/O bus 2216 is connected to a keyboard/mouse adapter 2218, a disk controller 2220, and an I/O adapter 2222. The disk controller 2220 may be connected to a storage 2226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Storage 2226 can store any program code or data useful in performing processes as disclosed herein or for performing building automation tasks. In particular embodiments, storage 2226 can include such elements as device event data 2252, root cause fault data 2254, analyses 2256 including survival analyses, cost analysis, and related curves and data, and other data 2258, as well as a stored copy of BAS application 2228. Other data 2258 can include the software architecture, any of its elements, or any other data, programs, code, tables, data lake depositories, or other information or data discussed above.

Also connected to the I/O bus 2216 in the example shown is an audio adapter 2224, to which speakers (not shown) may be connected for playing sounds. The keyboard/mouse adapter 2218 provides a connection for a pointing device (not shown), such as a mouse, trackball, trackpointer, etc. In some embodiments, the data processing system 2200 may be implemented as a touch screen device, such as, for example, a tablet computer or a touch screen panel. In these embodiments, elements of the keyboard/mouse adapter 2218 may be implemented in connection with the display 2211.

In various embodiments of the present disclosure, the data processing system 2200 can be used to implement as a workstation or as site controller 102 with all or portions of a BAS application 2228 installed in the memory 2208, configured to perform processes as described herein, and can generally function as the BAS described herein. For example, the processor 2202 executes program code of the BAS application 2228 to generate graphical interface 2230 displayed on display 2211. In various embodiments of the present disclosure, the graphical user interface 2230 provides an interface for a user to view information about and control one or more devices, objects, and/or points associated with the building automation system 100. The graphical user interface 2230 also provides an interface that is customizable to present the information and the controls in an intuitive and user-modifiable manner.

Those of ordinary skill in the art will appreciate that the hardware depicted in FIG. 22 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement discovery of objects and generation of hierarchies for the discovered objects.

The LAN/WAN/WiFi adapter 2212 may be connected to a network 2232, such as, for example, MLN 120 in FIG. 1. As further explained below, the network 2232 may be any public or private data processing system network or combination of networks known to those of skill in the art, including the Internet. Data processing system 2200 may communicate over network 2232 to one or more computers, which are also not part of the data processing system 2200, but may be implemented, for example, as a separate data processing system 2200.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of a system used herein may conform to any of the various current implementations and practices known in the art.

Disclosed embodiments provide significant advantages over other systems. For example, disclosed processes can reduce HVAC system operating costs by determining the remaining useful life for VAV components, forecast the maintenance budget for facilities management, and prevent downtime by using sensor and meter data to forecast fault occurrences.

By connecting Bayesian network-based fault detection and diagnostics with survival analysis processes, and providing congoing feedback between these processes, disclosed embodiments produce "lifelong" machine learning system that continually updates and refines the survival analysis for one or more devices, particularly in a BAS. Disclosed embodiments ensure that the performance of the machine learning processes can improve as more data is collected and processed. For "big data" applications, lifelong machine learning is a desirable feature.

When abnormal or faulty hardware devices are detected, disclosed embodiment can apply SA methods to estimate the remaining useful life of that device, as well as associated device groups. Such processes can combined BN and SA techniques to improve accuracy with a closed loop method. In this way, the forecast accuracy of BN and SA can both improve as there is more data collected. The disclosed SA processes can use either probabilistic or deterministic time-event data, while the other SA processes only accept deterministic data.

Disclosed embodiments can accept output from a BN as well as uncertain maintenance log data in realistic HVAC job logs. Disclosed embodiments can convert probabilistic time-event data into the deterministic time-event data and apply SA processes, and therefor care convert deterministic SA method processes to corresponding probabilistic processes.

Disclosed SA processes are not only suitable for traditional maintenance log data, but can also leverage sensor data and BN outputs for performance improvement. Where traditional SA methods only estimate the averaged RUL of a class of devices, disclosed embodiment can estimate the RUL of a device based on its usage pattern and so is more precise than other approaches. In addition, for device with limited sensor measurement, disclosed embodiments can collect data from associated devices and uses the BN to infer status of the device of interest.

Disclosed techniques can be applied to a cluster or aggregation of devices for joint Survival Analysis and Cost Analysis. Using novel operators such as AND SA, AND CA, OR SA, and OR CA, disclosed embodiments can aggregate devices together for joint SA or CA.

The following documents are incorporated by reference herein:
 United States Patent Publication US 20180335772A1;
 United States Patent Publication US 20180211176A1; and
 Chinese Patent CN110516848A.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form. In particular, any of the features disclosed herein may be combined with any of the features described in the applications and other documents incorporated by reference herein.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method in a building automation system, the method performed by a data processing system of the building automation system and comprising: receiving, at a network adapter, device event data corresponding to a physical device of the building automation system; executing, at a processor, an inference engine to determine root cause fault data corresponding to the device event data; executing, at the processor, a predictive maintenance engine to produce a survival analysis for the physical device based on the root cause fault data, wherein executing the predictive maintenance engine to produce a survival analysis includes receiving the root cause fault data, producing an augmented time-event table based on the root cause fault data, and generating a similarity-based survival curve using the augmented time-event table and based on the device event data corresponding to the physical device and device event data of other devices; producing, at the processor, updated failure data by the predictive maintenance engine, based on the survival analysis, and providing the updated failure data to the inference engine, wherein the inference engine thereafter uses the updated failure data in a subsequent root cause analysis; and control the various Parameter of the building automation based on the survival analysis.

2. The method of claim 1, further comprising generating survival curves for an aggregation of multiple devices using at least one of an AND SA operator or an OR SA operator that specify survival relationships between the multiple devices.

3. The method of claim 1, wherein the device event data is received, directly or indirectly, from one or more event detection applications that identify device or system events based on sensor data.

4. The method of claim 1, wherein the root cause fault data includes a probability of failure for the physical device for a specific time instance.

5. The method of claim 1, wherein the inference engine combines device event data with outputs of a Bayesian network to produce the root cause fault data.

6. A method in a building automation system, the method performed by a data processing system of the building automation system and comprising: receiving, at a network adapter, device event data corresponding to a physical device of the building automation system; executing, at a processor, an inference engine to determine root cause fault data corresponding to the device event data, executing, at the processor, a predictive maintenance engine to produce a survival analysis for the physical device based on the root cause fault data, wherein the survival analysis includes one or more survival curves produced by performing a probabilistic parametric survival analysis process, performing a probabilistic non-parametric survival analysis process, or performing a probabilistic similarity-based survival analysis process, producing, at the processor, updated failure data by the predictive maintenance engine, based on the survival analysis, and providing the updated failure data to the inference engine, wherein the inference engine thereafter uses the updated failure data in a subsequent root cause analysis; and control the various Parameter of the building automation based on the survival analysis.

7. The method of claim 1, further comprising executing the predictive maintenance engine to produce a cost analysis corresponding to the physical device, based on the survival analysis.

8. The method of claim 1, further comprising executing the predictive maintenance engine to produce a cost analysis corresponding to the physical device, based on the survival analysis, and generating a cost analysis for an aggregation of multiple devices using at least one of an AND CA operator or an OR CA operator that based on survival relationships between the multiple devices.

9. The method of claim 1, wherein the survival analysis includes performing a probabilistic similarity-based survival analysis process and includes performing principal component analysis and regression analysis on selected device event data to build a health index representing a survival probability for the physical device.

10. A building automation system comprising a plurality of physical devices and at least one data processing system configured to process device event data corresponding to the plurality of physical devices of the building automation system, wherein the building automation system is configured to: receive, at a network adapter, device event data corresponding to a physical device of the plurality of physical devices of the building automation system; execute, at a processor, an inference engine to determine root cause fault data corresponding to the device event data; execute, at the processor, a predictive maintenance engine to produce a survival analysis for the physical device based on the root cause fault data, wherein executing the predictive maintenance engine to produce a survival analysis includes receiving the root cause fault data, producing an augmented time-event table based on the root cause fault data, and generating a similarity-based survival curve using the augmented time-event table and based on the device event data corresponding to the physical device and device event data of other devices; produce, at the processor, updated failure data by the predictive maintenance engine, based on the survival analysis, and providing the updated failure data to the inference engine, wherein the inference engine thereafter uses the updated failure data in a subsequent root cause analysis; and control, at a controller, the various Parameter of the building automation based on the survival analysis.

11. The building automation system of claim 10, wherein the building automation system is further configured to generate survival curves for an aggregation of multiple devices using at least one of an AND SA operator or an OR SA operator that specify survival relationships between the multiple devices.

12. The building automation system of claim 10, wherein the device event data is received, directly or indirectly, from one or more event detection applications that identify device or system events based on sensor data.

13. The building automation system of claim 10, wherein the root cause fault data includes a probability of failure for the physical device for a specific time instance.

14. A building automation system comprising a plurality of physical devices and at least one data processing system configured to process device event data corresponding to the plurality of physical devices of the building automation system, wherein the building automation system is configured to: receive, at a network adapter, device event data corresponding to a physical device of the plurality of physical devices of the building automation system, execute, at a processor, an inference engine to determine root cause fault data corresponding to the device event data, execute, at the processor, a predictive maintenance engine to produce a survival analysis for the physical device based on the root cause fault data, wherein the survival analysis includes one or more survival curves produced by performing a probabilistic parametric survival analysis process, performing a probabilistic non-parametric survival analysis process, or performing a probabilistic similarity-based survival analysis process; produce, at the processor, updated failure data by the predictive maintenance engine, based on the survival analysis, and providing the updated failure data to the inference engine, wherein the inference engine thereafter uses the updated failure data in a subsequent root cause analysis; and control, at a controller, the various Parameter of the building automation based on the survival analysis.

15. The building automation system of claim 10, wherein the building automation system is further configured to execute the predictive maintenance engine to produce a cost analysis corresponding to the physical device, based on the survival analysis.

16. The building automation system of claim 10, wherein the building automation system is further configured to execute the predictive maintenance engine to produce a cost analysis corresponding to the physical device, based on the survival analysis, and generating a cost analysis for an aggregation of multiple devices using at least one of an AND CA operator or an OR CA operator that based on survival relationships between the multiple devices.

17. The building automation system of claim 10, wherein the survival analysis includes performing a probabilistic similarity-based survival analysis process and includes performing principal component analysis and regression analysis on selected device event data to build a health index representing a survival probability for the device.

18. A non-transitory machine readable medium encoded with executable instructions that, when executed, cause at least one processor in a building automation system to: receive, at a network adapter in communication with the at least one processor, device event data corresponding to a physical device of the building automation system; execute, at the at least one processor, an inference engine to determine root cause fault data corresponding to the device event data; execute, at the at least one processor, a predictive maintenance engine to produce a survival analysis for the physical device based on the root cause fault data; produce, at the at least one processor, updated failure data by the predictive maintenance engine, based on the survival analysis, and providing the updated failure data to the inference engine, wherein the inference engine thereafter uses the updated failure data in a subsequent root cause analysis; and control, at a controller, the various Parameter of the building automation based on the survival analysis.

* * * * *